US012567367B2

(12) United States Patent
Lee et al.

(10) Patent No.: US 12,567,367 B2
(45) Date of Patent: Mar. 3, 2026

(54) DISPLAY DEVICE AND PIXEL SENSING METHOD THEREOF

(71) Applicant: LG Display Co., Ltd., Seoul (KR)

(72) Inventors: Hyun Soo Lee, Paju-si (KR); Seo Jun Yeom, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 18/823,523

(22) Filed: Sep. 3, 2024

(65) Prior Publication Data

US 2025/0273141 A1 Aug. 28, 2025

(51) Int. Cl.
*G09G 3/3233* (2016.01)
*G09G 3/3266* (2016.01)
*G09G 3/3291* (2016.01)

(52) U.S. Cl.
CPC ......... *G09G 3/3233* (2013.01); *G09G 3/3266* (2013.01); *G09G 3/3291* (2013.01); *G09G 2310/0286* (2013.01)

(58) Field of Classification Search
CPC .. G09G 3/3233; G09G 3/3266; G09G 3/3291; G09G 2310/0286; G09G 2320/0295; G09G 2300/0842; G09G 2300/0426; G09G 2300/0452; G09G 2300/0819; G09G 2310/08; H10K 59/1213
See application file for complete search history.

(56) References Cited

U.S. PATENT DOCUMENTS

| | | | | |
|---|---|---|---|---|
| 2021/0233458 | A1* | 7/2021 | Yang | G09G 3/3225 |
| 2021/0287608 | A1* | 9/2021 | Min | G09G 3/3266 |
| 2022/0036813 | A1 | 2/2022 | Hwang et al. | |
| 2022/0208111 | A1* | 6/2022 | Baek | G09G 3/3266 |
| 2022/0319433 | A1* | 10/2022 | Yuan | G09G 3/3258 |
| 2022/0335866 | A1* | 10/2022 | Lee | G09G 3/3291 |

FOREIGN PATENT DOCUMENTS

| | | | |
|---|---|---|---|
| KR | 10-2020-0033564 | A | 3/2020 |
| KR | 10-2022-0015148 | A | 2/2022 |
| KR | 10-2461395 | B1 | 10/2022 |

* cited by examiner

*Primary Examiner* — Sujit Shah
(74) *Attorney, Agent, or Firm* — Fenwick & West LLP

(57) ABSTRACT

The present disclosure relates to a display device and a pixel sensing method thereof, and more particularly, to a display device and a pixel sensing method thereof, which reduce the size of a bezel area by reducing the number of gate signals for sensing, being output from a gate driving circuit, and sense pixel circuits by the gate signals for sensing the number of which is reduced.

16 Claims, 18 Drawing Sheets

DISPLAY DEVICE AND PIXEL SENSING METHOD THEREOF

CROSS-REFERENCE TO RELATED APPLICATION

This application claims priority to and the benefit of Republic of Korea Patent Application No. 10-2024-0028725, filed in the Republic of Korea on Feb. 28, 2024, which is hereby incorporated by reference in its entirety.

TECHNICAL FIELD

The present disclosure relates to a display device and a pixel sensing method thereof.

DESCRIPTION OF RELATED ART

An organic light emitting display device includes a self-luminous organic light emitting diode (hereinafter, referred to as "OLED"), and since the organic light emitting display device has not only a quick response speed, an excellent luminous efficiency, an excellent luminance, and an excellent viewing angle, but also an excellent contrast ratio and an excellent color gamut, it can express black gradation in complete black.

Such an organic light emitting display device includes a pixel circuit for operating an OLED. Here, the pixel circuit may include a driving element for driving the OLED. Here, the driving element may be a thin film transistor (TFT).

In addition, an electrical characteristic deviation may exist between pixel circuits of the organic light emitting display device. Here, the electrical characteristic of the pixel circuit may include a threshold voltage of the driving element, a mobility of the driving element, etc.

The electrical characteristic deviation between the pixel circuits may become greater as the driving time of the pixel circuits is increasing.

In order to compensate for a threshold voltage deviation of the driving elements that occurs between the pixel circuits, for example, the electrical characteristic deviation of the driving elements, an external compensation circuit may be added to the organic light emitting display device.

The external compensation circuit may include a sensing line for receiving an analog signal (voltage or current) including the electrical characteristic of the driving element, which is transferred from the pixel circuit, and an analog to digital converter (ADC) for converting the analog signal transferred through the sensing line into a digital value.

Here, the pixel circuit and the sensing line may be selectively connected to each other by gate signals for sensing which are outputted from a gate driving circuit.

SUMMARY

It is newly recognized by inventors of the present application that, in the related art, the gate driving circuit outputs the gate signals for sensing the number of which is equal to the number of pixel circuits which share one sensing line. Thus, the size of the gate driving circuit may become larger in proportion to the number of gate signals which are output from the gate driving circuit. Accordingly, in case that the gate driving circuit outputs the gate signals for sensing the number of which is equal to the number of pixel circuits which share one sensing line, the size of the gate driving circuit may become larger. In addition, since the gate driving circuit is disposed in a bezel area that is a non-display area of the organic light emitting display device, the size of the bezel area may also become larger as the size of the gate driving circuit becomes larger.

Therefore, the inventors of the present disclosure recognized the limitations mentioned above and other limitations associated with the related art, and conducted various experiments to implement a display device and a pixel sensing method thereof, which can reduce the size of a bezel area by reducing the number of gate signals for sensing which are output from a gate driving circuit, and can sense pixel circuits by the gate signals for sensing the number of which is reduced.

Additional features and aspects of the disclosure are set forth in part in the description that follows and in part will become apparent from the description or may be learned by practice of the inventive concepts provided herein. Other features and aspects of the inventive concepts may be realized and attained by the structures pointed out in the present disclosure, or derivable therefrom, and the claims hereof as well as the appended drawings.

To achieve these and other aspects of the inventive concepts, as embodied and broadly described herein, a display device includes: a display panel including a first pixel circuit and a second pixel circuit that share a data line and a sensing line, wherein the first pixel circuit includes a first switch element connected between the sensing line and an anode electrode of a first light-emitting element, and the second pixel circuit includes a second switch element connected between the sensing line and an anode electrode of a second light-emitting element, and wherein the first switch element and the second switch element share a same gate line.

The display device may further comprise a gate driving circuit configured to output a gate-on voltage of a (1-2)$^{th}$ gate signal to a (1-2)$^{th}$ gate line connected to the second pixel circuit after outputting a gate-on voltage of a (1-1)$^{th}$ gate signal to a (1-1)$^{th}$ gate line connected to the first pixel circuit, and to output a gate-on voltage of a second gate signal to a second gate line that is commonly connected to the first pixel circuit and the second pixel circuit; and a data driving circuit configured to output a data voltage for sensing to the data line during a gate-on voltage period of the (1-1)$^{th}$ gate signal, and to output the data voltage for sensing to the data line during a gate-on voltage period of a (1-2)$^{th}$ gate signal, wherein the second gate line is the same gate line shared by the first switch element and the second switch element.

The first pixel circuit and the data line may be electrically connected to each other by the (1-1)$^{th}$ gate signal so that the data voltage for sensing may be input to the first pixel circuit; and the second pixel circuit and the data line may be electrically connected to each other by the (1-2)$^{th}$ gate signal so that the data voltage for sensing may be input to the second pixel circuit.

The gate driving circuit may be configured to output the gate-on voltage of the (1-2)$^{th}$ gate signal to the (1-2)$^{th}$ gate line after inverting the gate-on voltage of the (1-1)$^{th}$ gate signal to a gate-off voltage and outputting the inverted gate-off voltage to the (1-1)$^{th}$ gate line.

The gate driving circuit may be configured to sequentially output the gate-on voltage of the (1-1)$^{th}$ gate signal and the gate-on voltage of the (1-2)$^{th}$ gate signal within a gate-on voltage period of the second gate signal.

The gate driving circuit may include a shift register circuit that outputs the (1-1)$^{th}$ gate signal and the (1-2)$^{th}$ gate signal and an edge trigger circuit that outputs the second gate signal.

The first pixel circuit may be configured to be driven in the order of a first sensing initialization period, a first sensing period, a first sensing voltage sampling period, and a first gate initialization period; the $(1\text{-}1)^{th}$ gate signal, the $(1\text{-}2)^{th}$ gate signal, and the second gate signal may be gate-off voltages in the first sensing initialization period; and the $(1\text{-}1)^{th}$ gate signal and the second gate signal may be the gate-on voltages and the $(1\text{-}2)^{th}$ gate signal may be the gate-off voltage in the first sensing period, the first sensing voltage sampling period, and the first gate initialization period.

The first pixel circuit may further include a first driving element for driving the first light-emitting element; the data voltage for sensing may be applied to a gate electrode of the first driving element through the data line during the first sensing period and the first sensing voltage sampling period; and a black data voltage may be applied to the gate electrode of the first driving element through the data line so that the gate electrode voltage of the first driving element may be initialized to the black data voltage during the first gate initialization period.

A first sensing voltage including a threshold voltage of the first driving element may be transferred to the sensing line in the first sensing period.

The second pixel circuit may be configured to be driven in the order of a second sensing initialization period, a second sensing period, a second sensing voltage sampling period, and a second gate initialization period after the first gate initialization period; the second gate signal may be the gate-on voltage and the $(1\text{-}1)^{th}$ gate signal and the $(1\text{-}2)^{th}$ gate signal may be the gate-off voltages in the second sensing initialization period; and the $(1\text{-}2)^{th}$ gate signal and the second gate signal may be the gate-on voltages and the $(1\text{-}1)^{th}$ gate signal may be the gate-off voltage in the second sensing period, the second sensing voltage sampling period, and the second gate initialization period.

The second pixel circuit may further include a second driving element for driving the second light-emitting element; the data voltage for sensing may be applied to a gate electrode of the second driving element through the data line during the second sensing period and the second sensing voltage sampling period; and a black data voltage may be applied to the gate electrode of the second driving element through the data line so that the gate electrode voltage of the second driving element may be initialized to the black data voltage during the second gate initialization period.

A second sensing voltage including a threshold voltage of the second driving element may be transferred to the sensing line in the second sensing period.

The gate-on voltage period of the $(1\text{-}1)^{th}$ gate signal and the gate-on voltage period of the $(1\text{-}2)^{th}$ gate signal may be equal to each other, and a gate-on voltage period of the second gate signal may be a period that is longer than four times the gate-on voltage period of the $(1\text{-}1)^{th}$ gate signal. However, the present disclosure is not limited thereto. For example, the gate-on voltage period of the second gate signal may be a period that is longer than two times, three times or five times the gate-on voltage period of the $(1\text{-}1)^{th}$ gate signal.

In another aspect, a pixel sensing method of a display device includes: electrically connecting a first pixel circuit to a data line, and electrically connecting a second pixel circuit to a sensing line together with the first pixel circuit; sensing an electrical characteristic of a first driving element included in the first pixel circuit by applying a data voltage for sensing to the data line; electrically separating the first pixel circuit from the data line; electrically connecting the second pixel circuit to the data line in a state that the first pixel circuit and the second pixel circuit are connected to the sensing line; and sensing an electrical characteristic of a second driving element included in the second pixel circuit by applying the data voltage for sensing to the data line, wherein the first pixel circuit and the second pixel circuit share the data line and the sensing line.

The pixel sensing method may further include: before electrically separating the first pixel circuit from the data line, initializing a gate electrode voltage of the first driving element to a black data voltage by applying the black data voltage to the data line.

The pixel sensing method may further include: after said sensing the electrical characteristic of the second driving element, initializing a gate electrode voltage of the second driving element to the black data voltage by applying the black data voltage to the data line; electrically separating the second pixel circuit from the data line; and electrically separating the first pixel circuit and the second pixel circuit from the sensing line.

The pixel sensing method may further include: after said electrically separating the first pixel circuit, initializing a voltage of the sensing line to an initialization voltage by applying the initialization voltage to the sensing line.

According to the example embodiments as described above, since one gate signal for sensing that is output from the gate driving circuit is commonly input to the pixel circuits, the number of gate signals for sensing being output from the gate driving circuit can be reduced, and thus the size of the gate driving circuit and the size of the bezel area may be reduced.

Various useful advantages and effects of the embodiments are not limited to the above-described contents and will be more easily understood from descriptions of the specific embodiments.

It is to be understood that both the foregoing general description and the following detailed description are exemplary and explanatory and are intended to provide further explanation of the inventive concepts as claimed.

BRIEF DESCRIPTION OF THE DRAWINGS

The accompanying drawings, that may be included to provide a further understanding of the disclosure and may be incorporated in and constitute a part of the disclosure, illustrate embodiments of the disclosure and together with the description serve to explain various principles of the disclosure.

The above and other aspects, features and advantages of the present disclosure will become more apparent to those of ordinary skill in the art by describing exemplary embodiments thereof in detail with reference to the attached drawings, in which.

Figure 1:
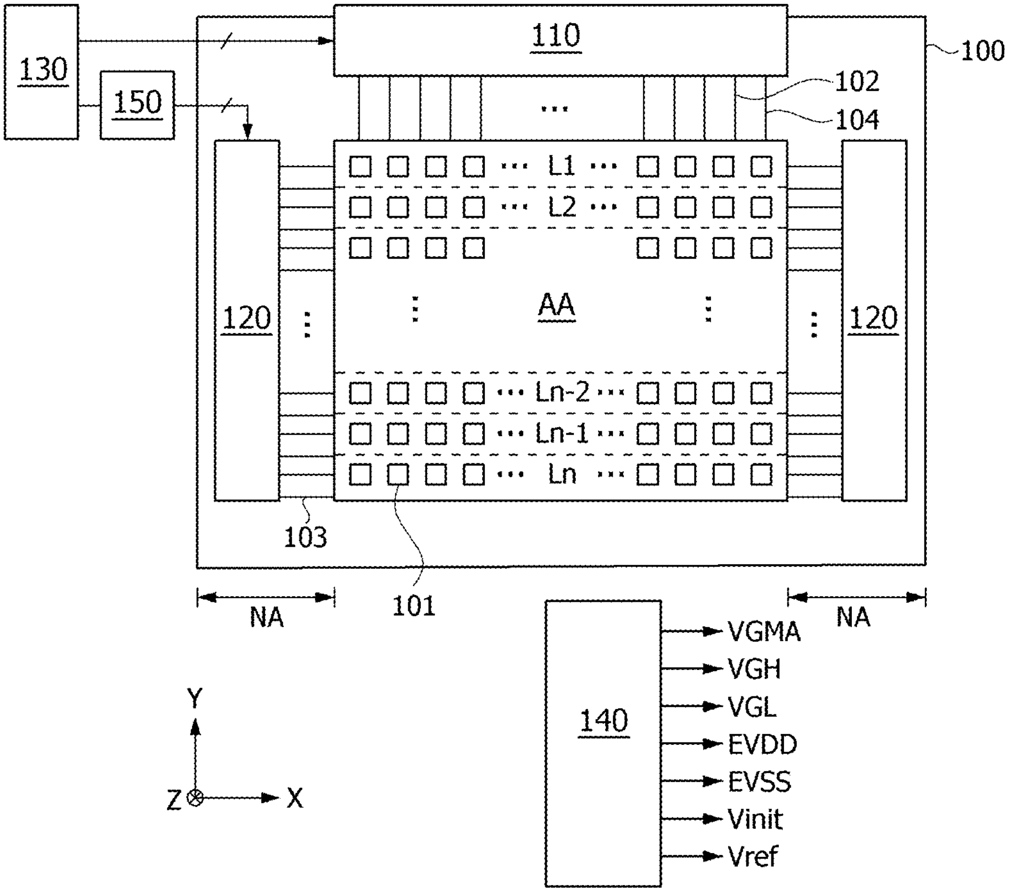
FIG. 1 is a block diagram showing a display device according to an example embodiment of the present disclosure.

Throughout the drawings and the detailed description, unless otherwise described, the same drawing reference numerals should be understood to refer to the same elements, features, and structures. The relative size and depiction of these elements may be exaggerated for clarity, illustration, and convenience.

DETAILED DESCRIPTION

Reference will now be made in detail to embodiments of the present disclosure, examples of which may be illustrated in the accompanying drawings. In the following description, when a detailed description of well-known functions or configurations related to this document is determined to unnecessarily cloud a gist of the inventive concept, the detailed description thereof will be omitted. The progression of processing steps and/or operations described is an example; however, the sequence of steps and/or operations is not limited to that set forth herein and may be changed as is known in the art, with the exception of steps and/or operations necessarily occurring in a particular order. Like reference numerals designate like elements throughout. Names of the respective elements used in the following explanations may be selected only for convenience of writing the specification and may be thus different from those used in actual products.

The advantages and features of the present disclosure and methods for accomplishing the same will be more clearly understood from example embodiments described below with reference to the accompanying drawings. However, the present disclosure is not limited to the following example embodiments but may be implemented in various different forms. Rather, the present embodiments will make the disclosure of the present disclosure complete and allow those skilled in the art to completely comprehend the scope of the present disclosure. The present disclosure is only defined within the scope of the accompanying claims. Any implementation described herein as an "example" is not necessarily to be construed as preferred or advantageous over other implementations.

Shapes, sizes, ratios, angles, numbers, and the like disclosed in the drawings for describing the example embodiments of the present disclosure are exemplary, and the present disclosure is not limited to the illustrated items. Like reference numerals refer to like elements throughout. In addition, in describing the present disclosure, if it is determined that the detailed description of the related known technology may unnecessarily obscure the subject matter of the present disclosure, the detailed description thereof will be omitted or briefly provided.

The terms such as "comprising," "including," and "having" used herein are generally intended to allow other components to be added unless the terms are used with the term "only." Any references to singular may include plural unless expressly stated otherwise.

Components are interpreted to include an ordinary error range even if not expressly stated.

For the description of a positional relationship, for example, when the positional relationship and the interconnected relationship between two parts is described as "on," "above," "below," "next to," "connect or couple", "crossing or intersecting", and the like, one or more other parts may be interposed therebetween unless a more limiting term such as "immediately" or "directly" is used in the expression.

The terms "first," "second," "A," "B," "(a)," "(b)" and the like may be used to distinguish components from each other, but the functions, structures, essence, sequence, order, or number of the components are not limited by ordinal numbers or component names in front of the components. Because the claims are written around essential components, the ordinal numbers preceding the component names in the claims may not match the ordinal numbers preceding the component names in the embodiments. Also, when an element or layer is described as being "connected," "coupled," or "adhered" to another element or layer, the element or layer can not only be directly connected, or adhered to that other element or layer, but also be indirectly connected, or adhered to that other another element or layer with one or more intervening elements or layers "disposed" between the elements or layers, unless otherwise specified.

The term "at least one" should be understood as including any and all combinations of one or more of the associated listed items. For example, the meaning of "at least one of a first element, a second element, and a third element" encompasses the combination of all three listed elements, combinations of any two of the three elements, as well as each individual element, the first element, the second element, or the third element.

Features of various embodiments of the present disclosure may be partially or overall coupled to or combined with each other, and may be variously inter-operated with each other and driven technically as those skilled in the art can sufficiently understand. Embodiments of the present disclosure may be carried out independently from each other, or may be carried out together in co-dependent relationship.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning for example consistent with their meaning in the context of the relevant art and should not be interpreted in an idealized or overly formal sense unless expressly so defined herein. For example, the term "part" or "unit" may apply, for example, to a separate circuit or structure, an integrated circuit, a computational block of a circuit device, or any structure configured to perform a described function as should be understood to one of ordinary skill in the art.

In a display device of the present disclosure, a display panel driving circuit, a pixel circuit, a level shifter, and the like may include transistors. The transistors may be implemented by oxide transistors including oxide semiconductor, low temperature poly silicon (LTPS) transistors including LTPS, and the like. Here, the transistor may be a thin film transistor (TFT).

A transistor is a three-terminal element including a gate, a source and a drain. The source is a terminal that supplies a carrier to the transistor. In the transistor, the carrier begins to flow from the source. A drain is a terminal through which the carrier flows out of the transistor. The flow of the carrier in the transistor flows from the source to the drain. In the case of an N-channel transistor, since the carrier is an electron, the source voltage has a voltage lower than the drain voltage so that electrons may flow from the source to the drain. In the N-channel transistor, the direction of current flows from the drain to the source. In the case of a P-channel transistor, since the carrier is a hole, the source voltage is higher than the drain voltage so that the hole may flow from the source to the drain. In the P-channel transistor, current flows from the source to the drain because the hole flows from the source to the drain. It should be noted that the source and drain of the transistor are not fixed. For example, the source and drain may be changed according to the applied voltage. Therefore, the present disclosure is not limited due to the source and drain of the transistor. In the following description, a drain and a source of a transistor is called a first electrode and a second electrode.

The scan signal swings between a gate-on voltage and a gate-off voltage. The gate-off voltage may be interpreted as a first voltage, and the gate-on voltage may be interpreted as a second voltage. The transistor is turned on in response to the gate-on voltage, while the transistor is turned off in response to the gate-off voltage. In the case of an N-channel transistor, the gate-on voltage may be a gate high voltage (VGH), and the gate-off voltage may be a gate low voltage (VGL). In the case of a P-channel transistor, the gate-on voltage may be the gate low voltage (VGL), and the gate-off voltage may be the gate high voltage (VGH).

Hereinafter, various example embodiments of the present disclosure will be described in detail with reference to the accompanying drawings. Further, all the components of each display device according to all embodiments of the present disclosure are operatively coupled and configured.

Figure 2:
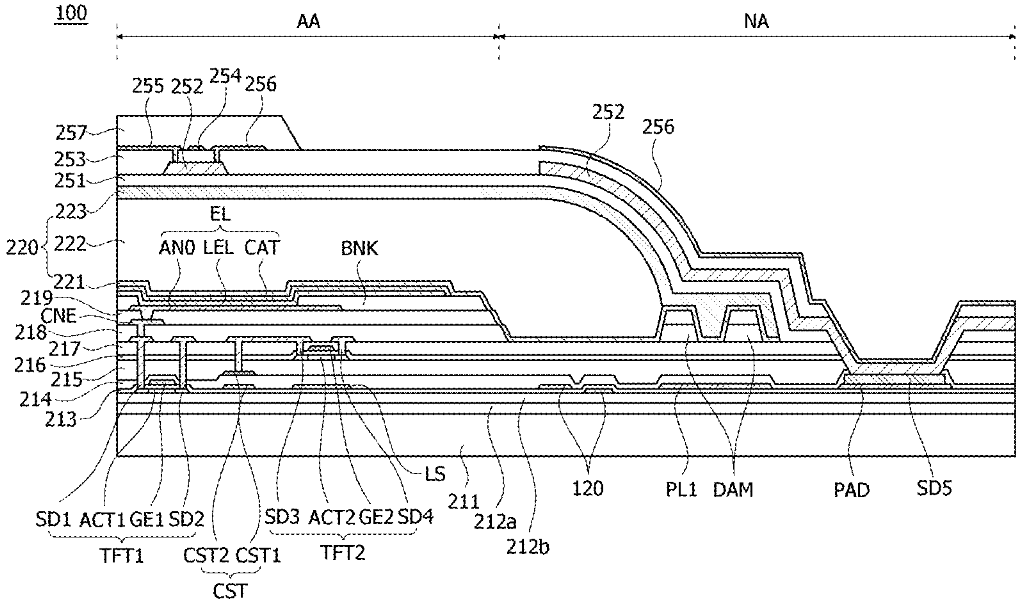
FIG. 2 is a cross-sectional view showing a cross-sectional structure of a display panel illustrated in FIG. 1 according to the example embodiment of the present disclosure.

FIG. 1 is a block diagram showing a display device according to an embodiment of the present disclosure. FIG. 2 is a cross-sectional view showing a cross-sectional structure of a display panel illustrated in FIG. 1 according to an embodiment of the present disclosure.

Referring to FIGS. 1 and 2, a display device according to an embodiment of the present disclosure may be an organic light emitting display device, but the present disclosure is not limited thereto. For example, the display device of the present disclosure may also be other types of display devices such as micro light-emitting diode (micro-LED) display device and the like. Such a display device includes a display panel 100, a display panel driving circuit for writing pixel data on pixel circuits of the display panel 100, and a power circuit 140 that generates a power required to drive the pixel circuits and the display panel driving circuit.

The display panel 100 may be a panel of a rectangular structure having a length in X-axis direction, a width in Y-axis direction, and a thickness in Z-axis direction, but the present disclosure is not limited thereto. As an example, the display panel 100 may be a panel having a rectangular structure with a length in the Y-axis direction, a width in the X-axis direction. As another example, the display panel 100 may be a panel having a structure of any shape such as a square shape, a circle shape, an oval shape, etc.

A display area AA of the display panel 100 includes a pixel array that displays an image thereon. The pixel array includes a plurality of data lines 102, a plurality of gate lines 103 that cross the plurality of data lines 102, a plurality of sensing lines 104, and pixel circuits 101 disposed in a matrix form at intersections of the plurality of data lines 102 and plurality of gate lines 103. The display panel 100 may further include power lines commonly connected to the pixel circuits 101. The power lines are connected to the pixel circuits, and supply the pixel circuits 101 with constant voltages required to drive the pixel circuits 101.

The pixel circuits 101 may be divided into two or more subpixel circuits for color implementation. For example, three subpixel circuits sequentially arranged in X-axis direction may be divided into a red subpixel circuit, a green subpixel circuit, and a blue subpixel circuit, but the present disclosure is not limited thereto.

Further, four subpixel circuits sequentially arranged in X-axis direction may be divided into a red subpixel circuit, a green subpixel circuit, a blue subpixel circuit, and a white subpixel circuit.

Each of the pixel circuits 101 is connected to the data line, the gate lines, and the power lines.

The pixel array includes a plurality of pixel lines L1 to Ln. Each of the pixel lines L1 to Ln includes 1-line pixel circuits 101 disposed along a line direction (X-axis direction) in the pixel array of the display panel 100. The pixel circuits disposed on 1 pixel line share the gate lines 103. The pixel circuits disposed in a column direction (Y-axis direction) along a data line direction share the same data line 102 and sensing line 104. As an example, one horizontal period is time obtained by dividing one frame period by the total number of pixel lines L1 to Ln.

The display panel 100 may be implemented as a non-transmission type display panel or a transmission type display panel. The transmission type display panel may be applied to a transparent display device in which an image is displayed on a screen and a real thing in the background is seen. The display panel 100 may be implemented as a flexible display panel or a non-flexible display panel.

At least a part of the display panel 100 may include a transmission type pixel structure that overlaps an optical device disposed on a lower part of the display panel 100. The optical device may include an image sensor (or camera), a proximity sensor, and an optical element such as an illumination element, or an infrared sensor for face recognition.

The cross-sectional structure of the display panel 100 is as follows.

FIG. 2 is a cross-sectional view showing the cross-sectional structure of a display panel illustrated in FIG. 1.

Referring to FIG. 2, the cross-sectional structure may include two thin film transistors TFT1 and TFT2 and one capacitor CST. The two thin film transistors TFT1 and TFT2 may include a polycrystalline thin film transistor TFT1 including a polycrystalline semiconductor material such as low temperature polysilicon (LTPS) and an oxide thin film transistor TFT2 including an oxide semiconductor material, but the present disclosure is not limited thereto.

The polycrystalline thin film transistor TFT1 illustrated in FIG. 2 may be an emission switching thin film transistor or a driving transistor connected to a light-emitting element EL, and the oxide thin film transistor TFT2 may be either one of switching thin film transistors connected to the capacitor CST.

In FIG. 2, one pixel circuit 101 includes a light-emitting element EL and a pixel driving circuit that applies a driving current to the light-emitting element EL. The pixel driving circuit is disposed on a substrate 211, and the light-emitting element EL is disposed on the pixel driving circuit. Further, an encapsulation layer 220 is disposed on the light-emitting element EL. The encapsulation layer 220 protects the light-emitting element EL.

The pixel driving circuit may refer to one pixel array section including a driving thin film transistor, a switching thin film transistor, and a capacitor. Further, the light-emitting element EL may refer to an array section for light emission that includes an anode electrode, a cathode electrode, and a light emission layer disposed therebetween.

In an embodiment, a driving thin film transistor and at least one switching thin film transistor use oxide semiconductor as an active layer. A thin film transistor that uses an oxide semiconductor material as an active layer has an excellent leakage current blocking effect and a relatively low manufacturing cost as compared with a thin film transistor that uses a polycrystalline semiconductor material as an active layer. Accordingly, in order to reduce the power consumption and to lower the manufacturing cost, the pixel driving circuit may include a driving thin film transistor and at least one switching thin film transistor using an oxide semiconductor material.

Further, all thin film transistors constituting the pixel driving circuit may be implemented by using the oxide semiconductor material, or only some switching thin film transistors may be implemented by using the oxide semiconductor material.

The substrate 211 may be implemented as a multi-layer in which an organic layer and an inorganic layer are alternately stacked. For example, the substrate 211 may be formed by alternately stacking an organic layer such as polyimide and an inorganic layer such as silicon oxide (SiO2).

In addition, the substrate 211 may include glass, plastic, or a flexible polymer film. For example, the flexible polymer film may be made of any one of polyethylene terephthalate (PET), polycarbonate (PC), acrylonitrile-butadiene-styrene copolymer (ABS), polymethyl methacrylate (PMMA), polyethylene naphthalate (PEN), polyether sulfone (PES), cyclic olefin copolymer (COC), triacetylcellulose (TAC) film, polyvinyl alcohol (PVA) film, polyimide (PI) film, and polystyrene (PS), which is only an example and is not necessarily limited thereto.

A lower buffer layer 212*a* is formed on the substrate 211. The lower buffer layer 212*a* blocks moisture or the like that may permeate from the outside, and may be used by stacking a silicon oxide (SiO2) layer or the like in multiple layers. An auxiliary buffer layer 212*b* may be further disposed on the lower buffer layer 212*a* to protect the element from moisture permeation.

The polycrystalline thin film transistor TFT1 is formed above the substrate 211. The polycrystalline thin film transistor TFT1 may use a polycrystalline semiconductor as an active layer. The polycrystalline thin film transistor TFT1 includes a first active layer ACT1 having a channel through which electrons or holes move, a first gate electrode GE1, a first source electrode SD1, and a first drain electrode SD2.

The first active layer ACT1 includes a first channel region, a first source region disposed on one side of the first channel region, and a first drain region disposed on the other side of the first channel region.

The first source region and the first drain region are regions formed by doping Group 5 or Group 3 impurity ions, e.g., phosphorus (P) or boron (B), into an intrinsic polycrystalline semiconductor material at a predetermined concentration to form a conductor. The first channel region provides a path through which electrons or holes move by maintaining an intrinsic state of the polycrystalline semiconductor material.

In addition, the polycrystalline thin film transistor TFT1 includes the first gate electrode GE1 overlapping the first channel region of the first active layer ACT1. A first gate insulating layer 213 is disposed between the first gate electrode GE1 and the first active layer ACT1. The first gate insulating layer 213 may be used as a single layer or multiple layers of an inorganic layer such as a silicon oxide (SiO2) layer, silicon nitride (SiNx) layer, or the like.

In one embodiment, the polycrystalline thin film transistor TFT1 has a top gate structure in which the first gate electrode GE1 is positioned above the first active layer ACT1, but the present disclosure is not limited thereto. For example, the polycrystalline thin film transistor TFT1 may have a bottom gate structure or a dual gate structure. Accordingly, a first electrode CST1 included in the capacitor CST and a light blocking layer LS included in the oxide thin film transistor TFT2 may be formed of the same material as the first gate electrode GE1. By forming the first gate electrode GE1, the first electrode CST1, and the light blocking layer LS by one mask process, the mask process may be reduced. However, the present disclosure is not limited thereto, the light blocking layer LS may be formed on the lower buffer layer 212*a* and the auxiliary buffer layer 212*b* by a separate mask process. In this case, the light blocking layer LS may be formed below any transistors, without being limited to the oxide thin film transistor TFT2. In addition, the light blocking layer LS may be disposed below the capacitor CST to overlap therewith to form a double capacitor.

The first gate electrode GE1 is made of a metallic material. For example, the first gate electrode GE1 may be a single layer or multiple layers made of any one of molybdenum (Mo), aluminum (Al), chromium (Cr), gold (Au), titanium (Ti), nickel (Ni), neodymium (Nd), and copper (Cu), or an alloy thereof, but is not limited thereto.

A first interlayer insulating layer 214 is disposed on the first gate electrode GE1. The first interlayer insulating layer 214 may be formed of silicon oxide (SiO2), silicon nitride (SiNx), or the like.

The display panel 100 may further include an upper buffer layer 215, a second gate insulating layer 216, and a second interlayer insulating layer 217 sequentially disposed on the first interlayer insulating layer 214. The polycrystalline thin film transistor TFT1 includes the first source electrode SD1 and the first drain electrode SD2 formed on the second interlayer insulating layer 217 and connected to the first source region and the first drain region, respectively.

The first source electrode SD1 and the first drain electrode SD2 may be a single layer or multiple layers made of any one of molybdenum (Mo), aluminum (Al), chromium (Cr), gold (Au), titanium (Ti), nickel (Ni), neodymium (Nd), and copper (Cu), or an alloy thereof, but are not limited thereto.

The upper buffer layer 215 separates a second active layer ACT2 of the oxide thin film transistor TFT2 made of an oxide semiconductor material from the first active layer ACT1 made of a polycrystalline semiconductor material and provides a basis for forming the second active layer ACT2.

The second gate insulating layer 216 covers the second active layer ACT2 of the oxide thin film transistor TFT2. The second gate insulating layer 216 is formed on the second active layer ACT2 made of an oxide semiconductor material and thus is implemented as an inorganic layer. For example, the second gate insulating layer 216 may be formed of silicon oxide (SiO2), silicon nitride (SiNx), or the like.

A second gate electrode GE2 is made of a metallic material. For example, the second gate electrode GE2 may be a single layer or multiple layers made of any one of molybdenum (Mo), aluminum (Al), chromium (Cr), gold (Au), titanium (Ti), nickel (Ni), neodymium (Nd), and copper (Cu), or an alloy thereof, but is not limited thereto.

In addition, the oxide thin film transistor TFT2 includes the second active layer ACT2 formed on the upper buffer layer 215 and made of an oxide semiconductor material, the second gate electrode GE2 disposed on the second gate insulating layer 216, and a second source electrode SD3 and a second drain electrode SD4 disposed on the second interlayer insulating layer 217.

The second active layer ACT2 is made of an oxide semiconductor material and includes an intrinsic second channel region that is not doped with impurities, and a second source region and a second drain region that are doped with impurities to become conductors.

The oxide thin film transistor TFT2 further includes the light blocking layer LS located below the upper buffer layer 215 and overlapping the second active layer ACT2. The light blocking layer LS may block light incident on the second active layer ACT2 to ensure the reliability of the oxide thin film transistor TFT2. The light blocking layer LS may be made of the same material as the first gate electrode GE1 and may be formed on the top surface of the first gate insulating layer 213. The light blocking layer LS may be electrically connected to the second gate electrode GE2 to form a dual gate structure.

The second source electrode SD3 and the second drain electrode SD4 may be simultaneously formed together with the first source electrode SD1 and the first drain electrode SD2 on the second interlayer insulating layer 217 using the same material, thereby reducing the number of mask processes.

In addition, the capacitor CST may be realized by disposing a second electrode CST2 on the first interlayer insulating layer 214 to overlap the first electrode CST1. The second electrode CST2 may be a single layer or multiple layers made of any one of, for example, molybdenum (Mo), aluminum (Al), chromium (Cr), gold (Au), titanium (Ti), nickel (Ni), neodymium (Nd), and copper (Cu), or an alloy thereof.

The capacitor CST stores the data voltage applied through the data line DL for a certain period of time and provides it to the light emitting element EL. The capacitor CST includes two electrodes corresponding to each other and a dielectric disposed therebetween. The first interlayer insulating layer 214 is positioned between the first electrode CST1 and the second electrode CST2.

The first electrode CST1 or the second electrode CST2 of the capacitor CST may be electrically connected to the second source electrode SD3 or the second drain electrode SD4 of the oxide thin film transistor TFT2. However, the present disclosure is not limited thereto, and the connection relationship of the capacitor CST may vary depending on the pixel driving circuit.

In addition, a first planarization layer 218 and a second planarization layer 219 are sequentially disposed on the pixel driving circuit to planarize a step caused due to the pixel driving circuit. The first planarization layer 218 and the second planarization layer 219 may be an organic layer such as polyimide or acrylic resin.

Then, the light emitting element EL is formed on the second planarization layer 219.

The light emitting element EL includes an anode electrode ANO, a cathode electrode CAT, and an emission layer LEL disposed between the anode electrode ANO and the cathode electrode CAT. When implemented in a pixel driving circuit that uses in common a low potential voltage connected to the cathode electrode CAT, the anode electrode ANO is disposed as a separate electrode for each sub-pixel. When implemented in a pixel driving circuit that uses a high potential voltage in common, the cathode electrode CAT may be disposed as a separate electrode for each sub-pixel.

The light emitting element EL is electrically connected to a driving element through an intermediate electrode CNE disposed on the first planarization layer 218. Specifically, the anode electrode ANO of the light emitting element EL and the first source electrode SD1 of the polycrystalline thin film transistor TFT1 constituting the pixel driving circuit are connected to each other through the intermediate electrode CNE.

The anode electrode ANO is connected to the intermediate electrode CNE exposed through a contact hole penetrating the second planarization layer 219. In addition, the intermediate electrode CNE is connected to the first source electrode SD1 exposed through a contact hole penetrating the first planarization layer 218, but is not limited thereto. For example, depending on the structure of the pixel driving circuit, the intermediate electrode CNE may be connected to the first drain electrode SD2, the second source electrode SD3 or the second drain electrode SD4.

The intermediate electrode CNE acts as a medium connecting the first source electrode SD1 to the anode electrode ANO. The intermediate electrode CNE may be made of a conductive material such as copper (Cu), silver (Ag), molybdenum (Mo), or titanium (Ti).

The anode electrode ANO may be formed in a multilayer structure including a transparent conductive layer and an opaque conductive layer having high reflection efficiency. The transparent conductive layer may be made of a material, such as indium-tin-oxide (ITO) or indium-zinc-oxide (IZO), having a relatively large work function value, while the opaque conductive layer may be formed in a single-layer or multilayer structure containing aluminum (Al), silver (Ag), copper (Cu), lead (Pb), molybdenum (Mo), titanium (Ti), or an alloy thereof. For example, the anode electrode ANO may be formed in a structure in which a transparent conductive layer, an opaque conductive layer, and a transparent conductive layer are sequentially stacked, or a structure in which a transparent conductive layer and an opaque conductive layer are sequentially stacked.

The emission layer LEL is formed by stacking a hole-related layer, an organic emission layer, and an electron-related layer on the anode electrode ANO in that order or in reverse order.

The bank layer BNK may be a pixel defining layer that exposes the anode electrode ANO of each pixel. The bank layer BNK may be made of an opaque material (e.g., black) to prevent or reduce light interference between adjacent pixels. In this case, the bank layer BNK contains a light blocking material made of at least one of a color pigment, organic black, and carbon. A spacer may be further disposed on the bank layer BNK.

The cathode electrode CAT is formed opposite to the anode electrode ANO with the emission layer LEL interposed therebetween, and is formed on the top surface and side surface of the emission layer LEL. The cathode electrode CAT may be integrally formed over the entire display area AA. When applied to atop emission type organic light emitting display device, the cathode electrode CAT may be formed of a transparent conductive layer such as indium-tin-oxide (ITO) or indium-zinc-oxide (IZO).

The encapsulation layer 220 for suppressing moisture permeation may be further disposed on the cathode electrode CAT.

The encapsulation layer 220 may block the permeation of external moisture or oxygen into the light emitting element EL, which is vulnerable to external moisture or oxygen. To achieve this, the encapsulation layer 220 may include at least one layer of inorganic encapsulation layer and at least one layer of organic encapsulation layer, but is not limited thereto. In the present disclosure, the structure of the encapsulation layer 220 in which a first encapsulation layer 221, a second encapsulation layer 222, and a third encapsulation layer 223 are sequentially stacked will be described as an example.

The first encapsulation layer 221 is formed over the substrate 211 over which the cathode electrode CAT is formed. The third encapsulation layer 223 is formed over the substrate 211 over which the second encapsulation layer 222 is formed, and may be formed to surround the top, bottom, and side surfaces of the second encapsulation layer 222 together with the first encapsulation layer 221. The first encapsulation layer 221 and the third encapsulation layer 223 may minimize, prevent or reduce the permeation of external moisture or oxygen into the light emitting element EL. The first encapsulation layer 221 and the third encapsulation layer 223 may be made of an inorganic insulating material, such as silicon nitride (SiNx), silicon oxide (SiOx), silicon oxynitride (SiON), or aluminum oxide (Al2O3), capable of low temperature deposition. Since the first encapsulation layer 221 and the third encapsulation layer 223 are deposited in a low temperature atmosphere, it is possible to prevent or reduce the light emitting element EL, which is vulnerable to a high temperature atmosphere, from being damaged during the deposition process of the first encapsulation layer 221 and the third encapsulation layer 223.

The second encapsulation layer 222 may serve as a buffer to relieve stress between layers caused by the bending of the display device, and may planarize a step difference between layers. The second encapsulation layer 222 may be formed of a non-photosensitive organic insulating material such as acrylic resin, epoxy resin, phenolic resin, polyamide resin, polyimide resin, polyethylene, or silicon oxycarbide (SiOC), or a photosensitive organic insulating material such as photoacrylic, above the substrate 211 over which the first encapsulation layer 221 is formed, but is not limited thereto. When the second encapsulation layer 222 is formed by an inkjet method, a dam DAM may be disposed to prevent or reduce the second encapsulation layer 222 in liquid form from diffusing to the edge of the substrate 211. The dam DAM may be disposed closer to the edge of the substrate 211 than the second encapsulation layer 222. Due to the dam DAM, the second encapsulation layer 222 may be prevented or reduced from diffusing to a pad region having a conductive pad disposed at the outermost portion of the substrate.

The dam DAM is designed to prevent or reduce the diffusion of the second encapsulation layer 222, but if the second encapsulation layer 222 is formed to exceed the height of the dam DAM during the process, the second encapsulation layer 222, which is an organic layer, may be exposed to the outside, which may facilitate the permeation of moisture or the like into the light emitting element. Therefore, to prevent or reduce this, at least ten or more dams DAM may be formed in an overlapping manner.

The dam DAM may be disposed on the second interlayer insulating layer 217 of a non-display area NA.

In addition, the dam DAM may be formed simultaneously with the first planarization layer 218 and the second planarization layer 219. When the first planarization layer 218 is formed, a lower layer of the dam DAM may be formed together, and when the second planarization layer 219 is formed, an upper layer of the dam DAM may be formed together, and they may be stacked in a double-layered structure.

Therefore, the dam DAM may be made of the same material as the first planarization layer 218 and the second planarization layer 219, but is not limited thereto.

The dam DAM may be formed to overlap a cathode power line PL1. For example, on a lower layer of an area where the dam DAM is located in a non-display area NA, the cathode power line PL1 may be formed. Here, the non-display area NA may include a bezel area.

The cathode power line PL1 and the gate driving circuit 120 configured in the form of a gate in panel (GIP) may be formed to surround the outer periphery of the display panel, and the cathode power line PL1 may be positioned further outward than the gate driving circuit 120. In addition, the cathode power line PL1 may be connected to the cathode electrode CAT to apply a common voltage. The gate driving circuit 120 is depicted simply in the plan and cross-sectional views of the drawings, but may be configured using a thin film transistor with the same structure as the thin film transistor of the display area AA.

The cathode power line PL1 is disposed outside of a gate driving circuit 120 to surround the display area AA. The cathode power line PL1 may be made of the same material as the material of a first gate electrode GE1, but is not limited thereto, and may be made of the same material as the material of the second electrode CST2, or first source and drain electrodes SD1 and SD2, but is not limited thereto.

Further, the cathode power line PL1 may be electrically connected to a cathode electrode CAT. The cathode power line PL1 may supply a cathode voltage EVSS to pixels of the display area AA.

A touch layer may be disposed on the encapsulation layer 220. Further, touch electrode lines connected to a plurality of touch sensors may be disposed on the touch layer. In case of a mutual capacitance type touch sensor, a plurality of TX lines to which a touch driving signal is applied and a plurality of RX lines for sensing a capacitance change before and after a touch may be disposed on the encapsulation layer 220. A touch sensor including mutual capacitance is disposed on each of intersections of the TX lines and the RX lines, and the touch sensor is connected to the corresponding TX line and RX line. There exists a dielectric layer disposed between the TX line and the RX line.

On the touch layer, a touch buffer layer 251 may be located between a touch sensor metal and the cathode electrode CAT of the light-emitting element EL.

The touch sensor metal may include first touch electrode lines 255 and 256 and a second touch electrode line 254 that crosses the first touch electrode lines 255 and 256. In addition, a touch electrode connection line 252 connects the first touch electrode lines 255 and 256 separated from each other with the second touch electrode line 254 interposed therebetween through contact holes penetrating a touch insulating layer 253. Here, the first touch electrode lines 255 and 256 may be interpreted as the TX lines, and the second touch electrode line 254 may be interpreted as the RX line. Further, the touch electrode connection line 252 may be interpreted as a bridge connecting pattern.

The touch buffer layer 251 may prevent or reduce a chemical solution (developer, etchant, or the like) used in the manufacturing process of the touch sensor metal disposed on the touch buffer layer 251, moisture from the outside, or the like from permeating the emission layer LEL containing an organic material. Accordingly, the touch buffer layer 251 may prevent or reduce damage to the light emitting layer LEL, which is susceptible to chemical solution or moisture.

The touch buffer layer 251 may be formed of an organic insulating material capable of being formed at a low temperature equal to or less than a certain temperature (e.g., 100° C.) and having a low dielectric constant of 1 to 3, to prevent or reduce damage to the emission layer LEL containing an organic material that is susceptible to high temperature. For example, the touch buffer layer 251 may be formed of an acrylic-based, epoxy-based, or siloxane-based material. The touch buffer layer 251 having a planarization performance made of an organic insulating material may prevent or reduce damage to the encapsulation layer 220 and cracking of the touch sensor metal formed on the touch buffer layer 251 caused by bending of the organic light emitting display device.

The touch electrode connection line 252 may be disposed to overlap a bank layer BNK and may prevent or reduce an aperture ratio from deteriorating.

In addition, in the non-display area NA, parts of the first touch electrode line 256 and the touch electrode connection line 252 may be electrically connected to a touch driving circuit (not illustrated) through a touchpad PAD by passing through an upper part and a side surface of the encapsulation layer 220 and an upper part and a side surface of the dam DAM.

Here, through a constitution in which a metal pattern SD5 is stacked on an upper part of the touchpad PAD, and the touch electrode connection line 252 and the first touch electrode line 256 are stacked on an upper part of the metal pattern SD5, the first touch electrode line 256 and the touch electrode connection line 252 may be electrically connected to the touchpad PAD. In the same manner as a first source electrode SD1 and a first drain electrode SD2, the metal pattern SD5 may be a single layer or a multilayer made of any one of molybdenum (Mo), aluminum (Al), chrome (Cr), gold (Au), titanium (Ti), nickel (Ni), neodymium (Nd), and copper (Cu) or alloys thereof, but is not limited thereto.

A part of the touch electrode connection line 252 may be supplied with a touch driving signal from a touch driving circuit to transfer the supplied touch driving signal to the first touch electrode lines 255 and 256, and may transfer the touch sensing signal from the second touch electrode line 254 to the touch driving circuit.

A touch protective film 257 may be disposed on the first touch electrode lines 255 and 256. In the drawing, although it is illustrated that the touch protective film 257 is disposed only on the first touch electrode lines 255 and 256, the disposition of the touch protective film 257 is not limited thereto, and the touch protective film 257 may be disposed even on the touch electrode connection line 252 through extension up to the front or rear of the dam DAM.

Further, a color filter (not illustrated) may be further disposed on the encapsulation layer 220, and the color filter may be located on the touch layer or between the encapsulation layer 220 and the touch layer. It is to be noted that although FIG. 2 shows a detailed layer structure of the display panel, but it is only provided by way of example, and the present disclosure is not limited thereto. For example, the layer structure of the display panel may be variously changed, and one or more of the buffer layers or the planarization layers may be omitted when necessary.

The power circuit 140 generates voltages (e.g., DC voltages or constant voltages) required to drive the pixel array of the display panel 100 and the display panel driving circuit by using, for example, a DC-DC converter. The DC-DC converter may include a charge pump, a regulator, a buck converter, a boost converter, and the like. The power circuit 140 may generate constant voltages, such as a gamma reference voltage VGMA, a gate-on voltage VGH, a gate-off voltage VGL, a pixel driving voltage EVDD, a cathode voltage EVSS, an initialization voltage Vinit, and a reference voltage Vref, by adjusting levels of the DC input voltage that is applied from an external device such as a host system (not illustrated). The gamma reference voltage VGMA is supplied to the data driving circuit 110. The gate-on voltage VGH and the gate-off voltage VGL are supplied to a level shifter 150 and a gate driving circuit 120. The constant voltages, such as the pixel driving voltage EVDD, the cathode voltage EVSS, the initialization voltage Vinit, and the reference voltage Vref, are supplied to the pixel circuits 101 through power lines. Here, the power lines are commonly connected to the pixel circuits 101.

In addition, the pixel driving voltage EVDD may be output from a main power of a host system (not illustrated), and may be supplied to the display panel 100. In this case, the power circuit 140 does not need to output the pixel driving voltage EVDD.

The display panel driving circuit writes pixel data of an input image in the pixel circuits of the display panel 100 under the control of a timing controller 130.

The display panel driving circuit includes a data driving circuit 110 and a gate driving circuit 120.

Further, the display panel driving circuit may further include a touch sensor driving circuit (not illustrated) for driving touch sensors. The data driving circuit 110 and the touch sensor driving circuit (not illustrated) may be integrated into one drive integrated circuit (IC). In a mobile device or a wearable device, the timing controller 130, the power circuit 140, the level shifter 160, the data driving circuit 110, and the touch sensor driving circuit (not illustrated) may be integrated into one drive IC.

The data driving circuit 110 receives the pixel data of the input image that is received from the timing controller 130 as a digital signal, and outputs a data voltage. The data driving circuit 110 converts the pixel data of the input image into a gamma compensation voltage for each frame period by using a digital to analog converter (DAC), and outputs the data voltage Vdata. The gamma reference voltage VGMA is divided into a gamma compensation voltage for each gradation through a voltage divider circuit. The gamma compensation voltage for each gradation is provided to the DAC of the data driving circuit 110. The data voltage Vdata is output on each of channels of the data driving circuit 110 through an output buffer.

In addition, during sensing driving of the pixel circuits 101 for external compensation, the data driving circuit 110 may alternately output a black data voltage Vblack and a data voltage for sensing Vdata_sen to the data line 102.

Further, the data driving circuit 110 transmit the electrical characteristic of the pixel circuit 101 transferred through the sensing line 104 to the timing controller 130. Here, the electrical characteristic of the pixel circuit 101 may be an analog value, and the data driving circuit 110 may convert the electrical characteristic of the pixel circuit 101 into a digital value, and may transmit the digital value to the timing controller 130. For this, the data driving circuit 110 may include an analog to digital converter (ADC) that converts an analog value into a digital value.

Through the above-described method, the data driving circuit 110 may transmit the respective electrical characteristics of the pixel circuits 101 included in the display panel 100 to the timing controller 130.

The data driving circuit 110 may be integrated into a source driver integrated circuit (SDIC). The source driver IC may be connected to a bonding pad of the display panel 100 in a tape automated bonding (TAB) method or a chip on glass (COG) method. Further, the source driver IC may be implemented in a chip on film (COF) method.

The gate driving circuit 120 may be disposed in a non-display area NA where an image is not displayed in the display panel 100. Here, the non-display area NA may be a bezel area.

For example, the gate driving circuit 120 may be disposed in both bezel areas of the display panel 100 with the display area AA of the display panel interposed therebetween, and may supply gate signals on both sides of the gate lines 103 in a double feeding method. The gate driving circuit 120 may be disposed on either side of the both bezel areas of the display panel 100, and may supply the gate signals to the gate lines 103 in a single feeding method.

Figure 3:
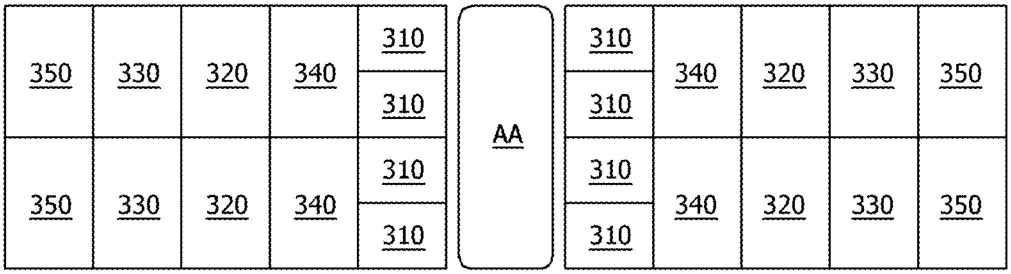
FIG. 3 is a diagram showing a layout structure of a gate driving circuit illustrated in FIG. 1 according to the example embodiment of the present disclosure.
Figure 4:
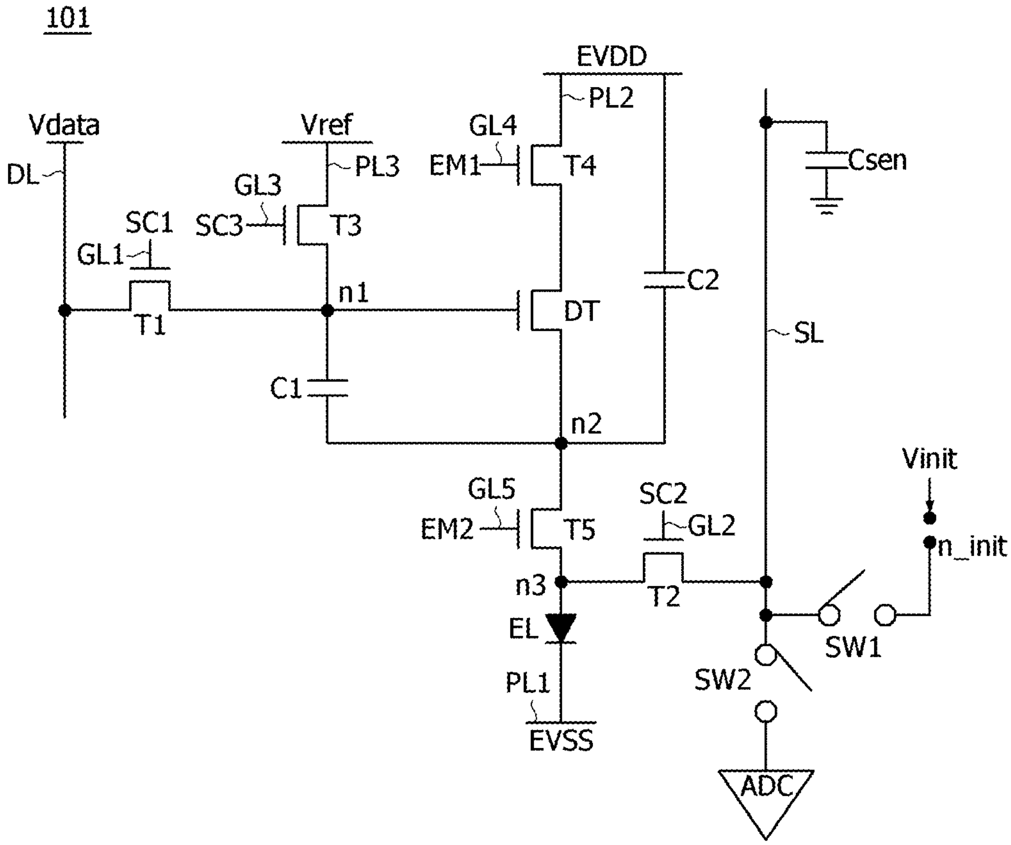
FIG. 4 is a circuit diagram exemplarily illustrating a pixel circuit according to an example embodiment of the present disclosure.

The gate driving circuit 120 may include a plurality of gate driving units that output pulses of the gate signals. In case of the pixel circuit as shown in FIG. 4, the gate driving circuit 120 may include, as shown in FIG. 3, a first gate driving unit 310 (e.g., a circuit) that outputs a first gate signal SC1, a second gate driving unit 320 (e.g., a circuit) that outputs a second gate signal SC2, a third gate driving unit 330 (e.g., a circuit) that outputs a third gate signal SC3, a fourth gate driving unit 340 (e.g., a circuit) that outputs a fourth gate signal EM1, and a fifth gate driving unit 350 (e.g., a circuit) that outputs a fifth gate signal EM2. Here, some of the plurality of gate driving units may be implemented as shift register circuits, and the remainders may be implemented as edge trigger circuits. Although FIG. 3 shows that the gate driving circuit 120 includes first to fifth gate driving units, the present disclosure is not limited thereto, and more or less gate driving units may be included in the gate driving circuit 120 when necessary.

For example, the first gate driving unit 310 may be implemented as a shift register circuit, and the second gate driving unit 320 to the fifth gate driving unit 350 may be implemented as the edge trigger circuits.

The shift register circuit may output the gate signal only to one pixel line, and the edge trigger circuit may commonly output the gate signal to two or more pixel lines.

Accordingly, the first gate driving unit 310 that is implemented as the shift register circuit may be connected to an odd pixel line and an even pixel line one by one.

Further, the second gate driving unit 320 to the fifth gate driving unit 350 which are implemented as the edge trigger circuits may be commonly connected to two pixel lines.

In an embodiment of the present disclosure, the fourth gate signal EM1 and the fifth gate signal EM2 may be emission signals, and the first gate signal SC1, the second gate signal SC2, and the third gate signal SC3 may be scan signals.

The fifth gate driving unit 350 that outputs the fifth gate signal EM2 that is the emission signal may be disposed on the outermost side of the gate driving circuit 120. Further, between the fourth gate driving unit 340 that outputs the fourth gate signal EM1 and the fifth gate driving unit 350, the second gate driving unit 320 that outputs the second gate signal SC2 that is the scan signal and the third gate driving unit 300 that outputs the third gate signal SC3 may be disposed.

Between the first gate driving unit 310 that outputs the first gate signal SC1 that is the scan signal and the second gate driving unit 320, the fourth gate driving unit 340 that outputs the fourth gate signal EM1 may be disposed. However, the present disclosure is not necessarily limited thereto.

In addition, although FIG. 3 illustrates that the gate driving units 340 and 350 which output the emission signals and the gate driving units 310, 320, and 330 which output the scan signals are disposed in left-right symmetry based on the display area AA, the present disclosure is not limited thereto, and the gate driving units 340 and 350 which output the emission signals and the gate driving units 310, 320, and 330 which output the scan signals may be disposed in left-right asymmetry based on the display area AA.

The timing controller 130 receives video data and a timing signal synchronized with the video data from a host system (not illustrated). The video data received by the timing controller 130 is a digital signal. The timing controller 130 may convert the video data to suit a data format that is used in the data driving circuit 110, and may transmit the converted video data to the data driving circuit 110. Here, the timing signal may include a vertical synchronization signal, a horizontal synchronization signal, a clock signal, and a data enable signal. Since a vertical period and a horizontal period can be known through a method for counting the data enable signal, the vertical synchronization signal and the horizontal synchronization signal may be omitted. The data enable signal has a cycle of one horizontal period (1H).

The timing controller 130 may generate a data timing control signal for controlling an operation timing of the data driving circuit 110, a gate timing control signal for controlling an operation timing of the gate driving circuit 120, and the like based on the timing signal received from the host system (not illustrated).

The gate timing control signal generated from the timing controller 130 may be input to the gate driving units 310, 320, 330, 340, and 350 of the gate driving circuit 120 through the level shifter 150. The level shifter 150 may receive the input gate timing control signal, and may generate and provide a start pulse and a shift clock to the gate driving circuit 120.

The timing controller 130 may transmit predetermined data for sensing and black gradation data to the data driving circuit 110 regardless of pixel data of an input video during a predetermined sensing driving period. Here, the data for sensing and the black gradation data may be stored in a built-in memory of the timing controller 130 as digital values.

The data for sensing may be set with different values by color and by gradation. During the sensing driving period, the data driving circuit 110 converts data for sensing and the black gradation data received from the timing controller 130 into a data voltage for sensing and a black data voltage, respectively, through conversion thereof into gamma compensation voltages. The data voltage for sensing and the black data voltage may be applied to the pixel circuits 101 through the data lines during the sensing driving period.

In addition, the timing controller 130 may receive the electrical characteristics of the pixel circuits 101, which have been converted into the digital values, from the data driving circuit 110. Further, the timing controller 130 may change the pixel data by using a compensation value for reducing the electrical characteristic deviation of the pixel circuits 101, and may transmit the changed pixel data to the data driving circuit 110. However, the present disclosure is not limited thereto. For example, the electrical characteristic deviation of the pixel circuits 101 may be compensated by an internal compensation manner in which the electrical characteristic deviation of the pixel circuits 101 is compensated within each of the pixel circuits 101.

As described above, the display device including the display panel driving circuit, the power circuit 140, and the level shifter 150 may be a display device in which the size of the bezel area is reduced through reduction of the number of gate signals for sensing which are output from the gate driving circuit 120 during the external compensation of the pixel circuit 101. Further, the display device may be a display device in which the pixel circuit 101 is sensed by the gate signals for sensing of which the number is reduced.

The pixel circuit 101 of the display device as described above may include the following constitutions.

FIG. 4 is a circuit diagram exemplarily illustrating a pixel circuit according to an embodiment of the present disclosure.

Referring to FIG. 4, a pixel circuit 101 may include a light-emitting element EL, a driving element DT that drives the light-emitting element EL, a first capacitor C1, a second capacitor C2, and a plurality of switch elements T1 to T5. Here, the driving elements DT and the plurality of switch elements T1 to T5 may be N-channel transistors, but are not limited thereto. Further, the N-channel transistor may be implemented as an oxide TFT.

The pixel circuit 101 is connected to a data line DL to which a data voltage Vdata is applied and gate lines GL1 to GL5 to which gate signals SC1, SC2, SC3, EM1, and EM2 are applied. Further, the pixel circuit 101 is connected to a sensing line SL to which an initialization voltage Vinit is applied during the display driving or during the external compensation.

Here, an initialization switch element SW1 and a sampling switch element SW2 may be connected to the sensing line SL. The initialization switch element SW1 may selectively connect an initialization voltage node n_init and the sensing line SL to each other, and the sampling switch element SW2 may selectively connect an analog to digital converter (ADC) and the sensing line SL to each other. The initialization switch element SW1 and the sampling switch element SW2 may be included in the data driving circuit 110 together with the analog to digital converter (ADC).

During the external compensation of the pixel circuit 101, a sensing voltage including the electrical characteristic of the pixel circuit 101 may be applied to the sensing line SL.

In addition, the pixel circuit 101 is connected to a cathode power line PL1 that supplies a cathode voltage EVSS, a driving power line PL2 that supplies a pixel driving voltage EVDD, and a reference power line PL3 that supplies a reference voltage Vref. On the display panel 100, the power lines PL1, PL2, and PL3 may be commonly connected to all pixels.

The gate signals SC1, SC2, SC3, EM1, and EM2 include swing pulses between the gate-on voltage VGH and the gate-off voltage VGL. The gate signals SC1, SC2, SC3, EM1, and EM2 include the first gate signal SC1, the second gate signal SC2, the third gate signal SC3, the fourth gate signal EM1, and the fifth gate signal EM2.

Figure 5:
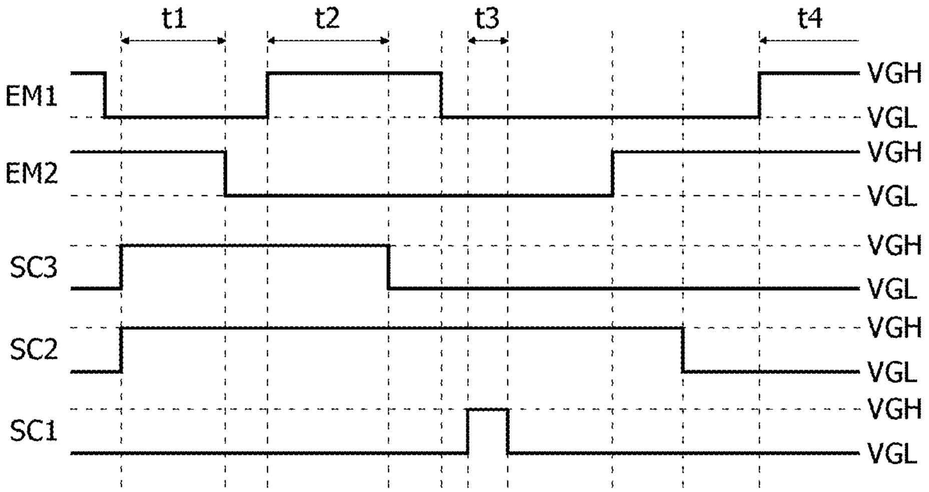
FIG. 5 is a waveform diagram showing waveforms of a gate signal that is applied during driving of a display of a pixel circuit illustrated in FIG. 4 according to the example embodiment of the present disclosure.

The display driving periods of the pixel circuit 101 may be driven in the order of an initialization period t1, a sampling period t2, a data writing period t3, and an emission period t4. As illustrated in FIG. 5, the initialization period t1, the sampling period t2, the data writing period t3, and the emission period t4 may be determined by waveforms of the gate signals SC1, SC2, SC3, EM1, and EM2.

Specifically, in the initialization period t1, the voltages of the second gate signal SC2, the third gate signal SC3, and the fifth gate signal EM2 are the gate-on voltages VGH. Further, the voltages of the first gate signal SC1 and the fourth gate signal EM1 are the gate-off voltages VGL.

In the sampling period t2, the voltages of the second gate signal SC2, the third gate signal SC3, and the fourth gate signal EM1 are the gate-on voltages VGH. Further, the voltages of the first gate signal SC1 and the fifth gate signal EM2 are the gate-off voltages VGL.

In the data writing period t3, the voltages of the first gate signal SC1 and the second gate signal SC2 are the gate-on voltages VGH. Further, the voltages of the third gate signal SC3, the fourth gate signal EM1, and the fifth gate signal EM2 are the gate-off voltages VGL.

In the emission period t4, the voltages of the fourth gate signal EM1 and the fifth gate signal EM2 are the gate-on voltages VGH. Further, the voltages of the first gate signal SC1, the second gate signal SC2, and the third gate signal SC3 are the gate-off voltages VGL.

In addition, the driving element DT of the pixel circuit 101 drives the light-emitting element EL by generating a driving current in accordance with the gate-source voltage Vgs. The driving element DT includes a gate electrode connected to a first node n1, the first electrode connected to the third switch element T3, and the second electrode connected to the second node n2. Here, the reference voltage Vref or the data voltage Vdata may be applied to the gate electrode of the driving element DT, and the pixel driving voltage EVDD may be applied to the first electrode. Specifically, the reference voltage Vref is applied to the gate electrode in the initialization period t1 and the sampling period t2, and the data voltage Vdata is applied to the gate electrode in the data writing period t3.

Further, the pixel driving voltage EVDD may be applied to the first electrode in the sampling period t2 and the emission period t4.

The light-emitting element EL may be implemented as an OLED. The light-emitting element EL includes the anode electrode and the cathode electrode, and emits light by the driving current from the driving element DT.

The anode electrode of the light-emitting element EL is connected to the third node n3, and the cathode electrode thereof is connected to the cathode power line PL1 that supplies the cathode voltage EVSS. Here, the third node n3 may be selectively connected to the second node n2 by the turn-on and turn-off of the fourth switch element T4.

The first capacitor C1 is connected between the first node n1 and the second node n2, and stores a threshold voltage Vth of the driving element DT having been sampled during the sampling period t2, and maintains the gate-source voltage Vgs of the driving element DT during the emission period t4.

The second capacitor C2 is connected between the second power line PL2 that supplies the pixel driving voltage EVDD and the second node n2.

In addition, the switch elements T1 to T5 of the pixel circuit 101 include the first switch element T1 that is turned on in response to the gate-on voltage VGH of the first gate signal SC1, the second switch element T2 that is turned on in response to the gate-on voltage VGH of the second gate signal SC2, the third switch element T3 that is turned on in response to the gate-on voltage VGH of the third gate signal SC3, the fourth switch element T4 that is turned on in response to the gate-on voltage VGH of the fourth gate signal EM1, and the fifth switch element T5 that is turned on in response to the gate-on voltage VGH of the fifth gate signal EM2.

The first switch element T1 is connected between the data line DL and the first node n1.

Specifically, the first electrode of the first switch element T1 is connected to the data line DL, and the second electrode thereof is connected to the first node n1. Further, the gate electrode thereof is connected to the first gate line GL1, and the first gate signal SC1 is applied to the gate electrode.

The first switch element T1 is turned on in response to the gate-on voltage VGH of the first gate signal SC1. If the first switch element T1 is turned on, the data line DL and the first node n1 are electrically connected to each other, and the data voltage Vdata is applied to the first node n1, for example, the gate electrode of the driving element DT.

Here, since the voltage of the first gate signal SC1 is the gate-on voltage VGH in the data writing period t3, the first switch element T1 is turned on only during the data writing period t3. Accordingly, the data voltage Vdata is applied to the gate electrode of the driving element DT in the data writing period t3.

The second switch element T2 is connected between the third node n3 and the sensing line SL.

Specifically, the first electrode of the second switch element T2 is connected to the third node n3, and the second electrode thereof is connected to the sensing line SL. Further, the gate electrode thereof is connected to the second gate line GL2, and the second gate signal SC2 is applied to the gate electrode.

The second switch element T2 is turned on in response to the gate-on voltage VGH of the second gate signal SC2. In the display driving of the pixel circuit 101, the initialization switch element SW1 may be turned on when the second switch element T2 is turned on. If the second switch element T2 and the initialization switch element SW1 are turned on, the sensing line SL and the initialization voltage node n_init are electrically connected to each other, and the sensing line SL and the third node n3 are electrically connected to each other, so that the initialization voltage Vinit is applied to the third node n3.

Here, since the voltage of the second gate signal SC2 is the gate-on voltage VGH during the initialization period t1, the sampling period t2, and the data writing period t3, the second switch element T2 is turned on during the initialization period t1, the sampling period t2, and the data writing period t3. During the above-described periods, the initialization switch element SW1 is also turned on.

Accordingly, the initialization voltage Vinit is applied to the third node n3 during the initialization period t1, the sampling period t2, and the data writing period t3, and the voltage of the third node n3 maintains the initialization voltage Vinit.

The third switch element T3 is connected between the reference power line PL3 and the first node n1.

Specifically, the first electrode of the third switch element T3 is connected to the reference power line PL3, and the second electrode thereof is connected to the first node n1. Further, the gate electrode thereof is connected to the third gate line GL3, and the third gate signal SC3 is applied to the gate electrode.

The third switch element T3 is turned on in response to the gate-on voltage VGH of the third gate signal SC3. If the third switch element T3 is turned on, the reference power line PL3 and the first node n1 are electrically connected to each other, and the reference voltage Vref is applied to the first node n1.

Here, since the voltage of the third gate signal SC3 is the gate-on voltage VGH during the initialization period t1 and the sampling period t2, the third switch element T3 is turned on during the initialization period t1 and the sampling period t2. Accordingly, during the initialization period t1 and the sampling period t2, the reference voltage Vref is applied to the first node n1, and thus the voltage of the first node n1 maintains the reference voltage Vinit.

The fourth switch element T4 is connected between the driving power line PL3 that supplies the pixel driving voltage EVDD and the first electrode of the driving element DT.

Specifically, the first electrode of the fourth switch element T4 is connected to the driving power line PL2, and the second electrode thereof is connected to the first electrode of the driving element DT. Further, the gate electrode thereof is connected to the fourth gate line GL4, and the fourth gate signal EM1 is applied to the gate electrode.

The fourth switch element T4 is turned on in response to the gate-on voltage VGH of the fourth gate signal EM1.

Here, since the voltage of the fourth gate signal EM1 is the gate-on voltage VGH in the sampling period t2 and the emission period t4, the fourth switch element T4 is turned on only during the sampling period t2, and then is turned on again in the emission period t4.

The fifth switch element T5 is connected between the second node n2 and the third node n3.

Specifically, the first electrode of the fifth switch element T5 is connected to the second node n2, and the second electrode thereof is connected to the third node n3. Further, the gate electrode thereof is connected to the fifth gate line GL5, and the fifth gate signal EM2 is applied to the gate electrode.

The fifth switch element T5 is turned on in response to the gate-on voltage VGH of the fifth gate signal EM2.

Here, since the voltage of the fifth gate signal EM2 is the gate-on voltage VGH in the emission period t4, the fifth switch element T5 is turned on only during the emission period t4, and electrically connects the second node n2 and the third node n3 to each other.

If the second node n2 and the third node n3 are connected to each other in the emission period t4, a current path is formed between the cathode power line PL1 and the driving power line PL2, and thus the driving current may flow to the light-emitting element EL. It is noted that the structure of the pixel circuit 101 shown in FIG. 4 and the driving timings of the pixel circuit 101 shown in FIG. 5 are provided by way of example only, and the present disclosure is not limited thereto. For example, more or less transistors and capacitors could be included in the pixel circuit of the present disclosure, and the driving method thereof may be variously changed.

Hereinafter, the operation of the pixel circuit 101 will be described step by step in accordance with the display driving period of the pixel circuit 101.

Figure 6:
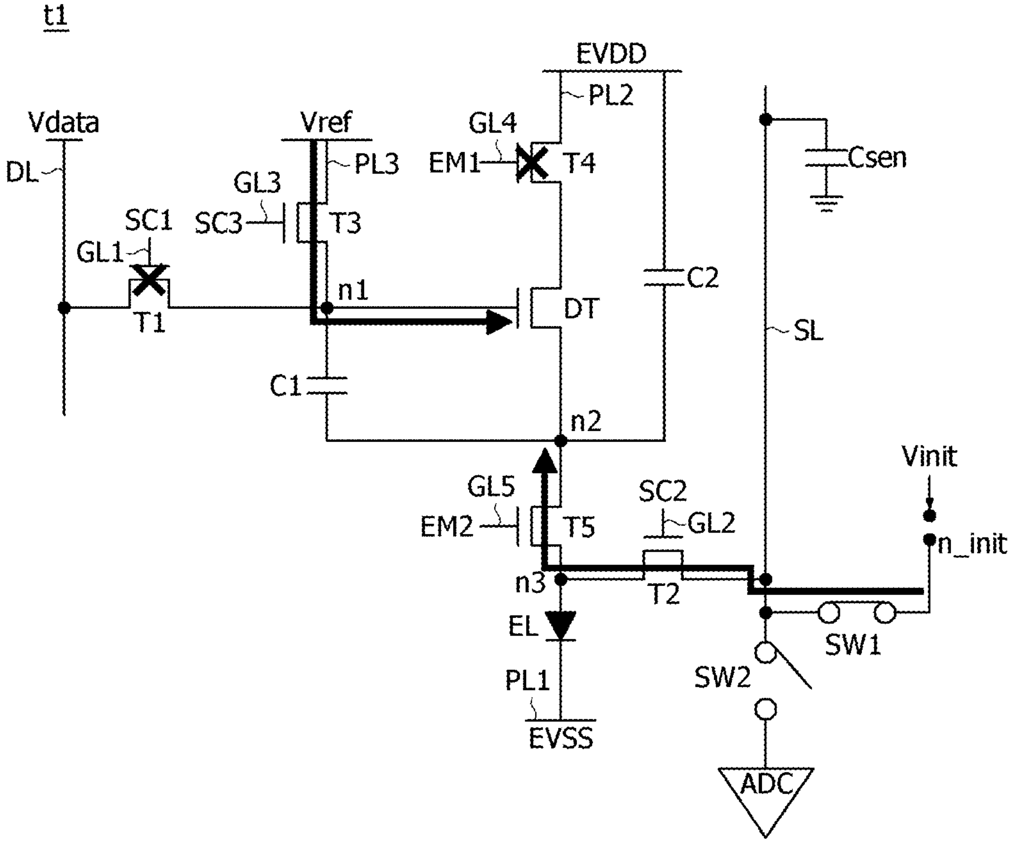
FIG. 6 is a diagram showing an example operation in an initialization period of a pixel circuit during driving of a display.
Figure 7:
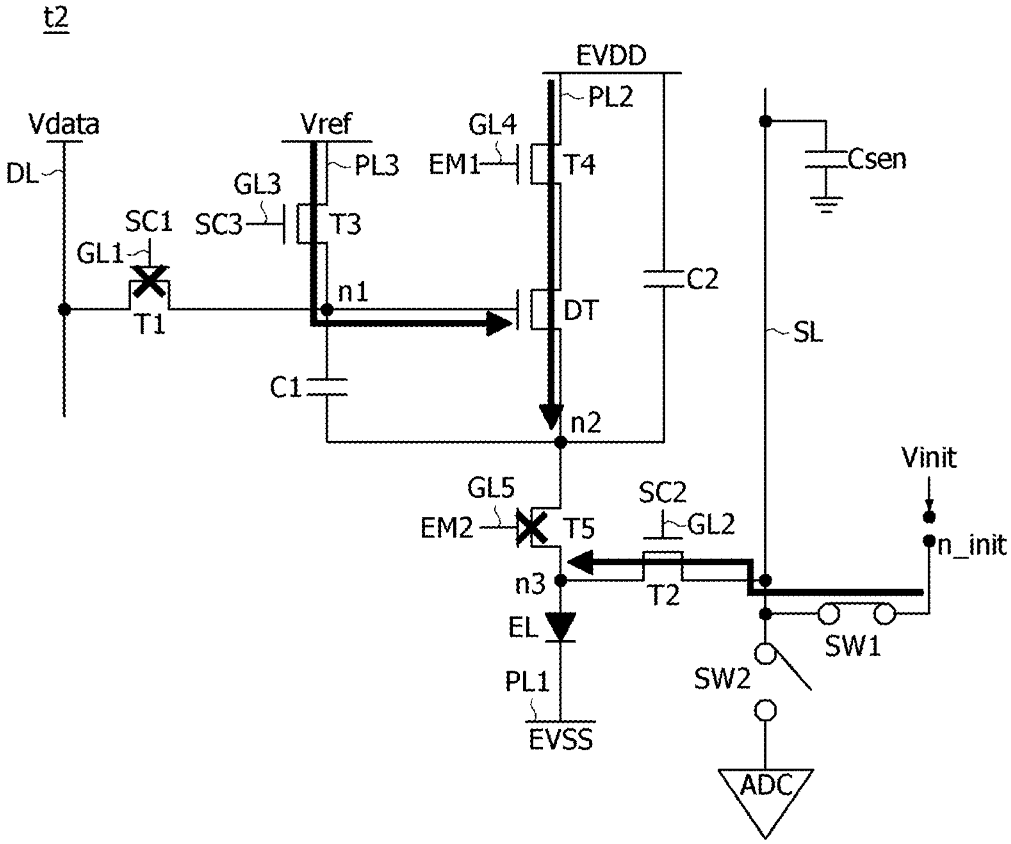
FIG. 7 is a diagram showing an example operation in a sampling period of a pixel circuit during driving of a display.
Figure 8:
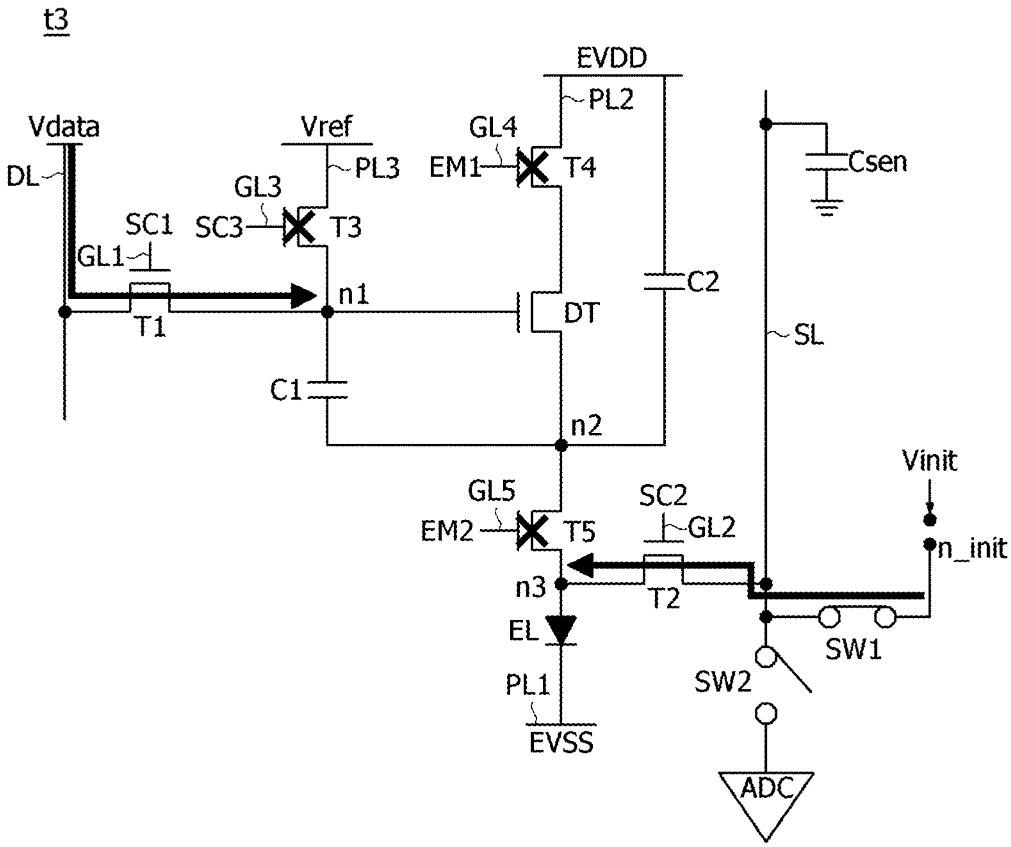
FIG. 8 is a diagram showing an example operation in a data writing period of a pixel circuit during driving of a display.
Figure 9:
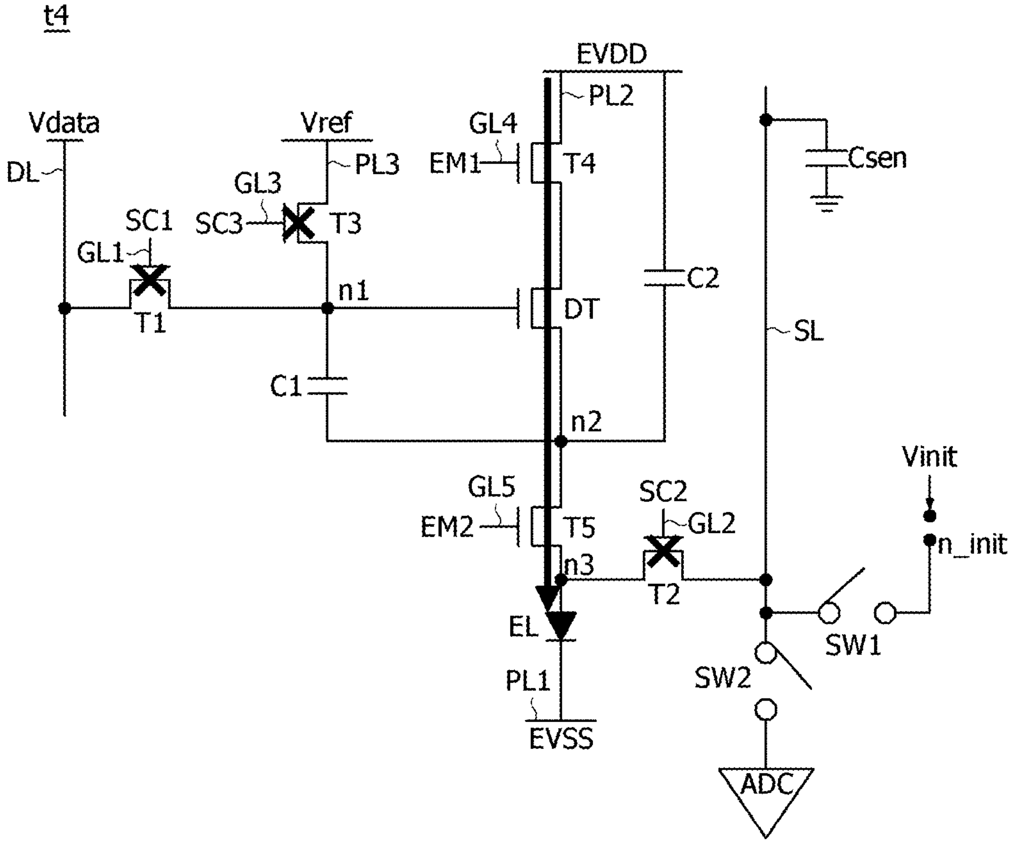
FIG. 9 is a diagram showing an example operation in an emission period of a pixel circuit during driving of a display.

FIG. 6 is a diagram showing an operation in an initialization period of a pixel circuit during driving of a display. FIG. 7 is a diagram showing an operation in a sampling period of a pixel circuit during driving of a display. FIG. 8 is a diagram showing an operation in a data writing period of a pixel circuit during driving of a display. FIG. 9 is a diagram showing an operation in a emission period of a pixel circuit during driving of a display.

Referring to FIG. 6, main nodes of the pixel circuit 101 are initialized during the initialization period t1. During the initialization period t1, the voltages of the second gate signal SC2, the third gate signal SC3, and the fifth gate signal EM2 are the gate-on voltages VGH as in FIG. 5. During the initialization period t1, the voltages of the first gate signal SC1 and the fourth gate signal EM1 are the gate-off voltages VGL.

Accordingly, during the initialization period t1, the second switch element T2 is turned on in response to the gate-on voltage VGH of the second gate signal SC2, and the fifth switch element T5 is turned on in response to the gate-on voltage VGH of the fifth gate signal SC5. Further, the third switch element T3 is turned on in response to the gate-on voltage VGH of the third gate signal SC3.

In addition, the first switch element T1 and the fourth switch element T4 are turned off in accordance with the gate-off voltages VGL of the first gate signal SC1 and the fourth gate signal EM1. As a result, in the initialization period t1, the voltage of the first node n1 is initialized to the reference voltage Vref, and the voltages of the second node n2 and the third node n3 are initialized to the initialization voltage Vint. Here, the initialization switch element SW1 is also turned on during the initialization period t1.

Referring to FIG. 7, the threshold voltage Vth of the driving element DT is sampled by the first capacitor C1 during the sampling period t2.

During the sampling period t2, the voltages of the second gate signal SC2, the third gate signal SC3, and the fourth gate signal EM1 are the gate-on voltage VGH as in FIG. 5. During the sampling period t2, the voltages of the first gate signal SC1 and the fifth gate signal EM2 are the gate-off voltages VGL.

Accordingly, during the sampling period t2, the second switch element T2 maintains a turn-on state in response to the gate-on voltage VGH of the second gate signal SC2, and the third switch element T3 maintains a turn-on state in response to the gate-on voltage VGH of the third gate signal SC3. Further, the fourth switch element T4 is turned on in response to the gate-on voltage VGH of the fourth gate signal EM1.

In addition, the first switch element T1 and the fifth switch element T5 are turned off in accordance with the gate-off voltages VGL of the first gate signal SC1 and the fifth gate signal EM2.

As a result, in the sampling period t2, the voltage of the first node n1 maintains the reference voltage Vref, and the second node n2 is saturated with a specific voltage through voltage increase of the second node n2 by the pixel driving voltage EVDD. Here, the saturated voltage of the second node n2 may be a voltage (Vref−Vth) obtained by subtracting the threshold voltage Vth of the driving element DT from the reference voltage Vref.

In the sampling period t2, the voltage of the third node n3 maintains the initialization voltage Vinit. Here, during the sampling period t2, the initialization switch element SW1 maintains a turn-on state.

Referring to FIG. 8, the data voltage Vdata of the pixel data is applied to the first n ode n1 during the data writing period t3.

During the data writing period t3, the voltages of the first gate signal SC1 and the second gate signal SC2 are the gate-on voltages VGH as in FIG. 5. During the data writing period t3, the voltages of the third gate signal SC3, the fourth gate signal EM1, and the fifth gate signal EM2 are the gate-off voltages VGL.

Accordingly, during the data writing period t3, the first switch element T1 is turned on in response to the gate-on voltage VGH of the first gate signal SC1, and the second switch element T2 maintains a turn-on state in response to the gate-on voltage VGH of the second gate signal SC2.

In addition, the third switch element T3 is turned off in accordance with the gate-off voltage VGL of the third gate signal SC3, and the fourth switch element T4 and the fifth switch element T5 are turned off in accordance with the gate-off voltages VGL of the fourth gate signal EM1 and the fifth gate signal EM2.

As a result, in the data writing period t3, the voltage of the first node n1 becomes the data voltage Vdata. In this case, due to capacitance coupling in accordance with a capacitance distribution ratio ($\alpha$=C1+C2+Coled) of the first capacitor C1 and the second capacitor C2, the voltage of the second node n2 becomes Vref−Vth+$\alpha$(Vdata−Vref). Here, Coled means a parasitic capacitor that is formed between the anode electrode and the cathode electrode of the light-emitting element EL.

In the data writing period t3, the voltage of the third node n3 maintains the initialization voltage Vinit. Here, during the data writing period t3, the initialization switch element SW1 maintains a turn-on state.

Referring to FIG. 9, during the emission period t4, the voltages of the fourth gate signal EM1 and the fifth gate signal EM2 are the gate-on voltages VGH as in FIG. 5. During the emission period t4, the voltages of the first gate signal SC1, the second gate signal SC2, and the third gate signal SC3 are the gate-off voltages VGL.

Accordingly, during the emission period t4, the fourth switch element T4 is turned on in response to the gate-on voltage VGH of the fourth gate signal EM1, and the fifth switch element T5 is turned on in response to the gate-on voltage VGH of the fifth gate signal EM2.

In addition, the first switch element T1, the second switch element T2, and the third switch element T3 are turned off in accordance with the gate-off voltages VGL of the first gate signal SC1, the second gate signal SC2, and the third gate signal SC3.

In accordance with the turn-on or turn-off of the switch elements as described above, a current path is formed between the cathode power line PL1 and the driving power line PL2 in the emission period t4, and the light-emitting element EL can emit light by the driving current that follows through the driving element DT. Here, the light-emitting element EL can emit light with the brightness corresponding to the gradation value of the pixel data.

In addition, in the emission period t4, the voltage of the first node n1 becomes the data voltage Vdata, and the voltage of the second node n2 becomes Vref−Vth+$\alpha$(Vdata−Vref).

Further, the current Ioled that flows to the light-emitting element EL during the emission period t4 is determined by the following Equation:

$$I_{oled} = K(Vgs - Vth)^2 \quad \text{[Equation 1]}$$

$$= K[V\text{data} - Vref + Vth + \alpha(V\text{data} - Vref) - Vth]^2$$

$$= K[(1-\alpha)(V\text{data} - Vref)]^2 \quad .....$$

... \\ ...

Here, Vgs is a gate-source voltage of a driving element DT, and K means a constant value that is determined by mobility and parasitic capacitance of a driving element DT. Further, Vinit means an initialization voltage, Vdata means a data voltage, Vref means a reference voltage, Vth means a threshold voltage of a driving element DT, and a means a capacitance distribution ratio.

As in Mathematical expression 1 above, in the current Ioled that flows to the light-emitting element EL, the threshold voltage Vth that is the electrical characteristic of the driving element DT is not reflected, but only the data voltage Vdata is reflected. In other words, the current Ioled that flows to the light-emitting element EL is the current in which the threshold voltage Vth of the driving element DT is compensated for.

In addition, during the emission period t4, one or more of the fourth gate signal EM1 and the fifth gate signal EM2 may be generated as a pulse width modulation (PWM) pulse. The PWM pulse may have a duty ratio that is changed in accordance with a digital brightness value (DBV).

As described above, the display device according to an embodiment of the present disclosure can perform internal compensation during the display driving of the pixel circuit 101. Here, the internal compensation means the compensation so that the threshold voltage Vth of the driving element DT is not reflected in the driving current through reflection of the threshold voltage Vth of the driving element DT in the gate-source voltage Vgs of the driving element DT in the sampling period t2 of the pixel circuit 101.

In addition, the display device according to an embodiment of the present disclosure can perform the sensing driving of the pixel circuit 101 for the external compensation in at least any one of a power-on sequence where the power starts to be applied and a power-off sequence where the power of the display device is blocked. The display device can block the power after performing the sensing driving of the pixel circuit 101 in the power-off sequence.

Figure 10:
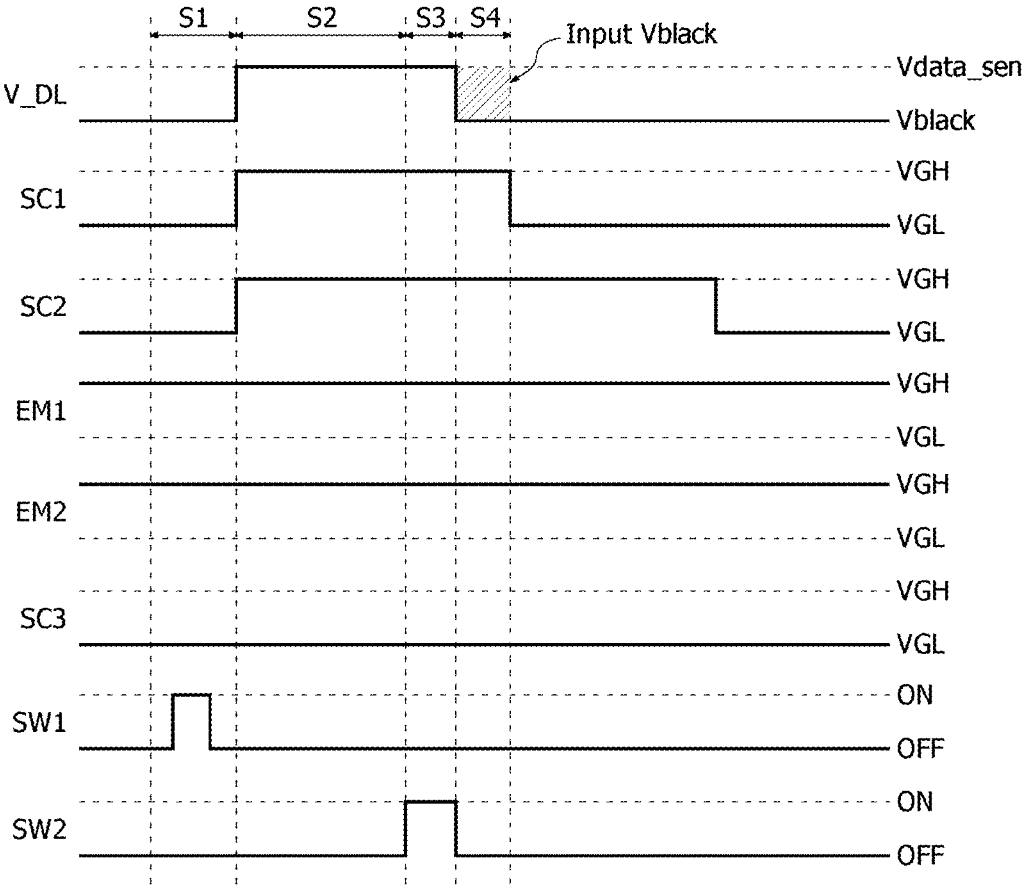
FIG. 10 is a waveform diagram showing example waveforms of signals being applied during sensing driving of a pixel circuit illustrated in FIG. 4.

FIG. 10 is a waveform diagram showing waveforms of signals being applied during sensing driving of a pixel circuit illustrated in FIG. 4.

Referring to FIG. 10, during sensing driving of the pixel circuit 101 for external compensation, a data voltage for sensing Vdata_sen or an input black data voltage Vblack may be applied to the data line DL. The data voltage for sensing (Vdata_sen) and the black data voltage Vblack may be output from the data driving circuit 110.

During the sensing driving of the pixel circuit 101 for the external compensation, the first gate signal SC1 may be a gate signal for data writing for selectively connecting the data line DL and the pixel circuit 101 to each other. Further, the second gate signal SC2 may be a gate signal for sensing for selectively connecting the pixel circuit 101 and the sensing line SL to each other.

The first gate signal SC1 and the second gate signal SC2 are output from the gate driving circuit 120. Specifically, the first gate signal SC1 is output from the first gate driving unit 310 of the gate driving circuit 120. Further, the second gate signal SC2 is output from the second gate driving unit 320 of the gate driving circuit 120. Here, the first gate driving unit 310 may be a shift register circuit, and the second gate driving unit 320 may be an edge trigger circuit.

A control signal for turning on or off the initialization switch element SW1 and the sampling switch element SW2 may be an external signal which is generated by a separate circuit that is not the data driving circuit 110 and is transmitted to the data driving circuit 110, or an internal signal generated from an inside of the data driving circuit 110. Here, the external signal may be a gate signal generated from the gate driving circuit 120.

Sensing driving of the pixel circuit 101 is performed in the order of a sensing initialization period S1, a sensing period S2, a sensing voltage sampling period S3, and a gate initialization period S4. Here, the sensing voltage sampling period S3 may have time that is longer than 8 horizontal periods (8H). The gate initialization period S4 may also have time that is longer than 8 horizontal periods (8H).

The voltage of the third gate signal SC3 maintains the gate-off voltage VGL from the sensing initialization period S1 to the gate initialization period S4, and the voltages of the fourth gate signal EM1 and the fifth gate signal EM2 maintain the gate-on voltages VGH. Accordingly, from the sensing initialization period S1 to the gate initialization period S4, the third switch element T3 maintains a turn-off state, and the fourth switch element T4 and the fifth switch element T5 maintain a turn-on state.

In the sensing initialization period S1, the voltages of the first gate signal SC1 and the second gate signal SC2 are the gate-off voltages VGL. Accordingly, in the sensing initialization period S1, the first switch element T1 and the second switch element T2 are turned off.

Further, in the sensing initialization period S1, the initialization switch element SW1 is turned on.

In the sensing period S2, the voltages of the first gate signal SC1 and the second gate signal SC2 are the gate-on voltages VGH. Accordingly, in the sensing period S2, the first switch element T1 and the second switch element T2 are turned on.

Further, in the sensing period S2, the initialization switch element SW1 and the sampling switch element SW2 are all turned off.

In the sensing voltage sampling period S3, the voltages of the first gate signal SC1 and the second gate signal SC2 are the gate-on voltages VGH. Accordingly, in the sensing voltage sampling period S3, the first switch element T1 and the second switch element T2 maintain a turn-on state.

Further, in the sensing voltage sampling period S3, the sampling switch element SW2 is turned on.

In the gate initialization period S4, the voltages of the first gate signal SC1 and the second gate signal SC2 are the gate-on voltages VGH. Accordingly, in the gate initialization period S4, the first switch element T1 and the second switch element T2 maintain a turn-on state.

Further, in the gate initialization period S4, the initialization switch element SW1 and the sampling switch element SW2 are all turned off.

Hereinafter, the operation of the pixel circuit 101 will be described step by step in accordance with the sensing driving period of the pixel circuit 101.

Figure 11:
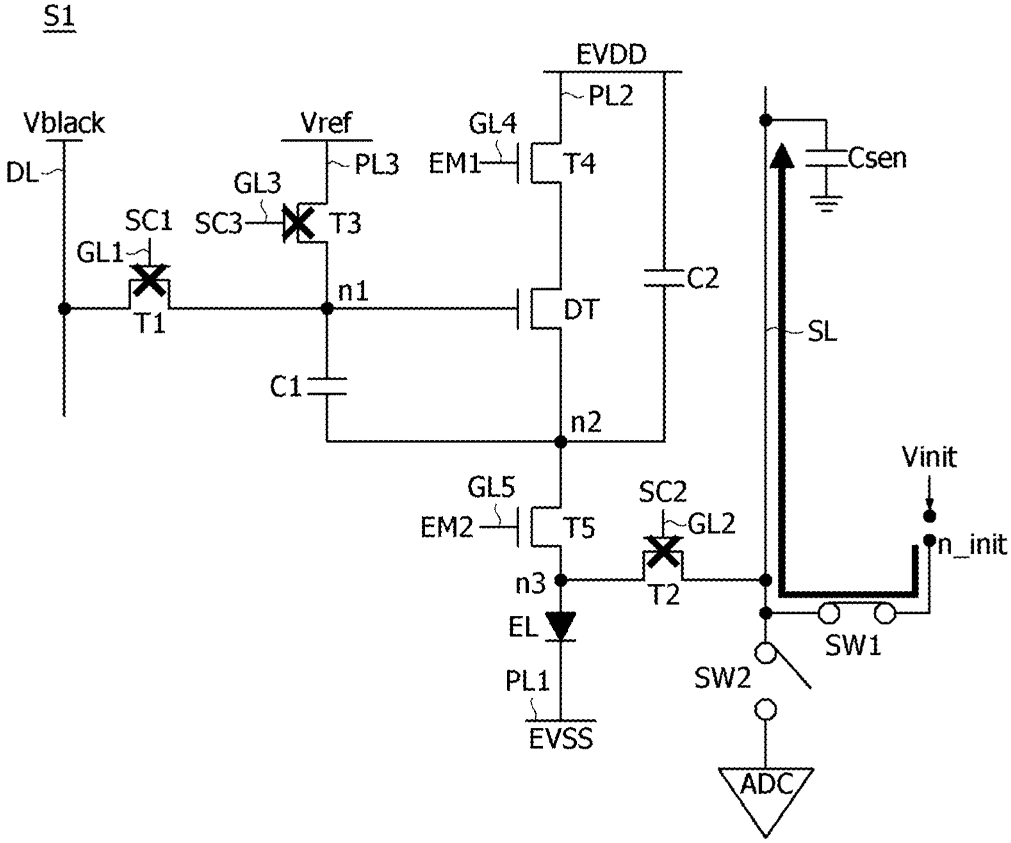
FIG. 11 is a diagram showing an example operation in a sensing initialization period of a pixel circuit during sensing driving.
Figure 12:
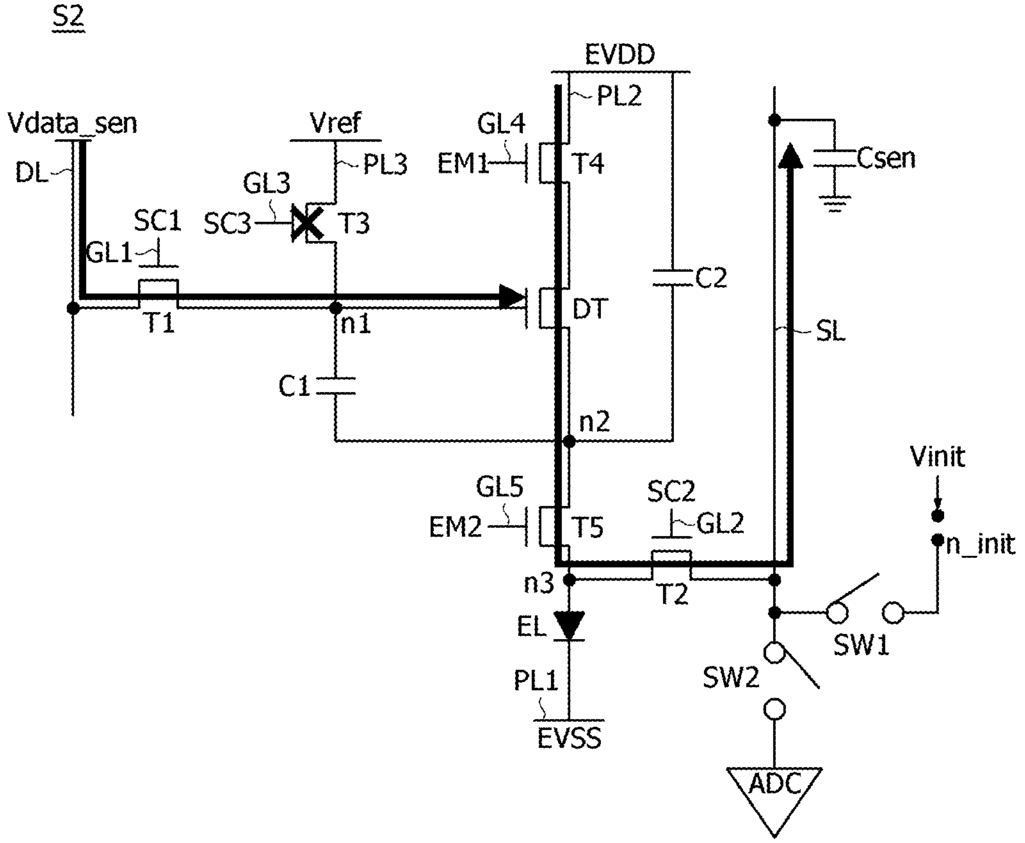
FIG. 12 is a diagram showing an example operation in a sensing period of a pixel circuit during sensing driving.
Figure 13:
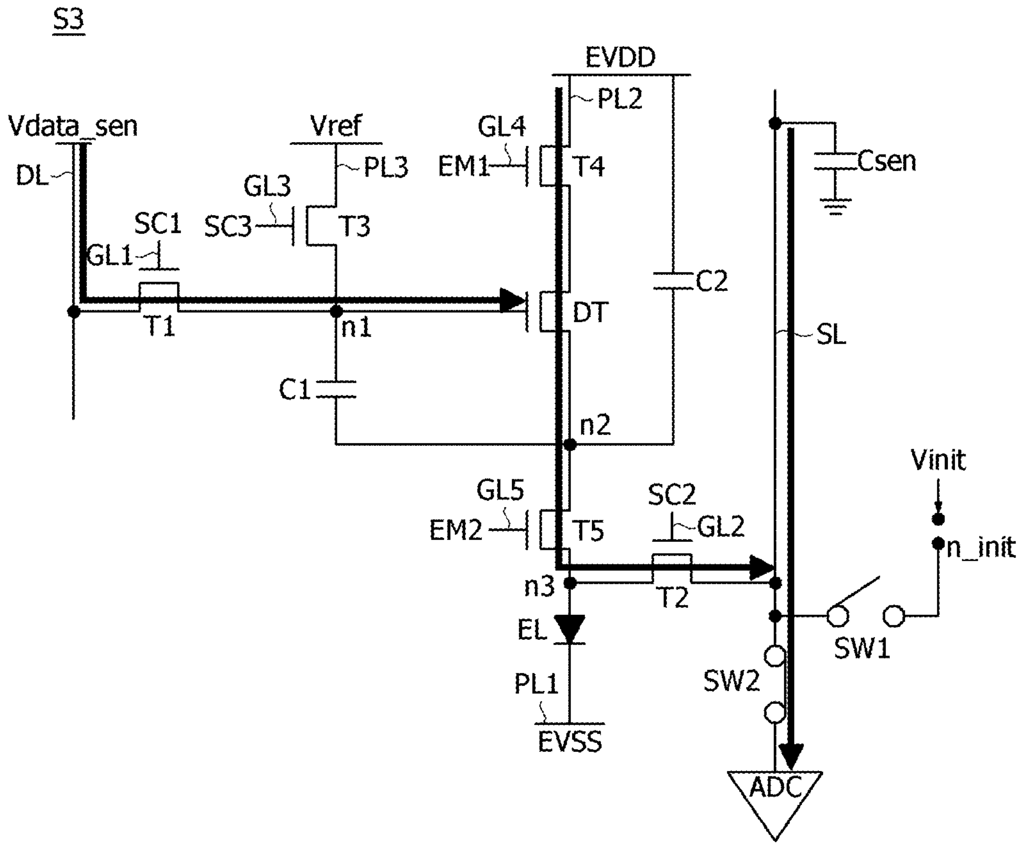
FIG. 13 is a diagram showing an example operation in a sensing voltage sampling period of a pixel circuit during sensing driving.
Figure 14:
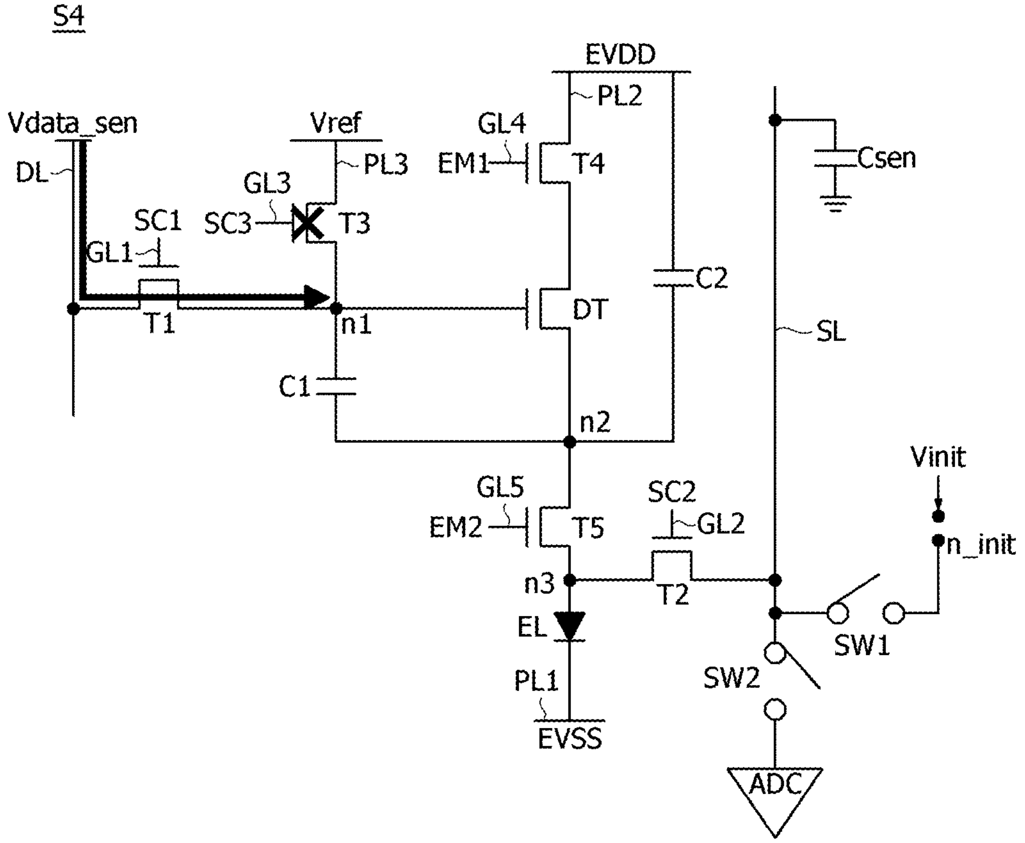
FIG. 14 is a diagram showing an example operation in a gate initialization period of a pixel circuit during sensing driving.

FIG. 11 is a diagram showing an operation in a sensing initialization period of a pixel circuit during sensing driving according to one embodiment. FIG. 12 is a diagram showing an operation in a sensing period of a pixel circuit during sensing driving according to one embodiment. FIG. 13 is a diagram showing an operation in a sensing voltage sampling period of a pixel circuit during sensing driving according to one embodiment. FIG. 14 is a diagram showing an operation in a gate initialization period of a pixel circuit during sensing driving according to one embodiment.

During the sensing driving of the pixel circuit 101, the light-emitting element EL does not emit light.

Referring to FIG. 11, during the sensing initialization period S1, the sensing line SL is initialized to the initialization voltage Vinit.

During the sensing initialization period S1, the voltages of the first gate signal SC1 and the second gate signal SC2 are the gate-off voltages VGL as in FIG. 10, and thus the first switch element T1 and the second switch element T2 are turned off.

Further, in the sensing initialization period S1, the initialization switch element SW1 is turned on.

As a result, in the sensing initialization period S1, the initialization voltage Vinit is applied to the sensing line SL, and thus the sensing line SL is initialized to the initialization voltage Vinit. Here, the voltage of the capacitor for sensing Csen connected to the sensing line SL corresponds to the voltage of the sensing line SL. Accordingly, in the sensing initialization period S1, the capacitor for sensing Csen is also initialized to the initialization voltage Vinit.

Since in the sensing initialization period S1, the black data voltage Vblack is applied to the data line DL, but the first switch element T1 is in a turn-off state, the black data voltage Vblack is not applied to the first node n1.

Referring to FIG. 12, since the voltages of the first gate signal SC1 and the second gate signal SC2 are the gate-on voltages VGH as in FIG. 10 during the sensing period S2, the first switch element T1 and the second switch element T2 are turned on. Further, in the sensing period S2, the data voltage for sensing Vdata_sen is applied to the data line DL. In other words, in the sensing period S2, the voltage V_DL of the data line DL becomes the data voltage for sensing Vdata_sen.

In the sensing period S2, the initialization switch element SW1 and the sampling switch element SW2 are all turned off. As a result, in the sensing period S2, the voltage of the first node n1 becomes the data voltage for sensing Vdata_sen. Here, the data voltage for sensing Vdata_sen is a voltage that is higher than the threshold voltage Vth of the driving element DT. Accordingly, in the sensing period S2, the driving element DT is turned on.

If the driving element DT is in a turn-on state, the second node n2 is saturated with a specific voltage through voltage increase of the second node n2 by the pixel driving voltage EVDD. Here, the saturated voltage of the second node n2 may be a voltage (Vdata_sen−Vth) obtained by subtracting the threshold voltage Vth of the driving element DT from the data voltage for sensing Vdata_sen.

In case that the second switch element T2 is in a turn-on state, the capacitor for sensing Csen connected to the sensing line SL may be charged with the voltage of the second node n2.

Accordingly, in the sensing period S2, the voltage of the capacitor for sensing Csen may also be a voltage of Vdata_sen−Vth.

Referring to FIG. 13, since the voltages of the first gate signal SC1 and the second gate signal SC2 are the gate-on voltages VGH as in FIG. 10 during the sensing voltage sampling period S3, the first switch element T1 and the second switch element T2 maintain a turn-on state. Further, even in the sensing voltage sampling period S3, the voltage V_DL of the data line DL becomes the data voltage for sensing Vdata_sen.

In the sensing voltage sampling period S3, the initialization switch element SW1 maintains a turn-off state, and the sampling switch element SW2 is turned on and electrically connects the sensing line SL and the analog to digital converter ADC.

As a result, in the sensing voltage sampling period S3, the voltage of the first node n1 maintains the data voltage for sensing Vdata_sen, and the voltage of the second node n2 also maintains a voltage of Vdata_sen−Vth.

Further, the voltage (Vdata_sen−Vth) charged in the capacitor for sensing Csen is transferred to the analog to digital converter (ADC) through the sensing line SL. Here, the voltage (Vdata_sen−Vth) charged in the capacitor for sensing Csen is a sensing voltage in which the threshold voltage that is the electrical characteristic of the driving element DT is included.

The analog to digital converter (ADC) may convert the sensing voltage that is an analog value into sensing data that is a digital value. The converted sensing data may be transmitted to the timing controller 130.

Referring to FIG. 14, since the voltages of the first gate signal SC1 and the second gate signal SC2 are the gate-on voltages VGH as in FIG. 10 during the gate initialization period S4, the first switch element T1 and the second switch element T2 maintain a turn-on state. Further, in the gate initialization period S4, a black data voltage Vblack is applied to the data line DL, and thus the voltage V_DL of the data line DL is changed from the data voltage for sensing Vdata_sen to the black data voltage Vblack.

In the gate initialization period S4, the sampling switch element SW2 is turned off, and the initialization switch element SW1 maintains a turn-off state.

As a result, in the gate initialization period S4, the voltage of the first node n1 is initialized from the data voltage for sensing Vdata_sen to the black data voltage Vblack.

In other words, in an embodiment of the present disclosure, the display device completes the sensing of the pixel circuit 101 for the external compensation, and thus maintains the first switch element T1 in a turn-on state for a predetermined time even after the voltage V_DL of the data line DL is changed to the black data voltage Vblack.

Through this, the gate electrode of the driving element DT is initialized to the black data voltage Vblack applied to the data line DL. Here, the black data voltage Vblack may be a voltage that is lower than the threshold voltage Vth of the driving element DT. For example, the black data voltage Vblack may be a voltage included in the voltage range of 0.2 V to 0.5 V. Accordingly, in the gate initialization period S4, the driving element DT may be turned off.

In an embodiment of the present disclosure, the reason why the gate electrode of the driving element DT is initialized to the black data voltage Vblack is as follows.

First, during the external compensation, the display device may perform the sensing driving of the pixel circuit 101 multiple times, and may change the voltage value of the data voltage for sensing Vdata_sen every sensing driving of the pixel circuit 101. For example, during the first sensing driving of the pixel circuit 101, the data voltage for sensing Vdata_sen may have a first voltage value, and during the second sensing driving, the data voltage for sensing Vdata_sen may have a second voltage value that is larger than the first voltage value. Further, during the third sensing driving, the data voltage for sensing Vdata_sen may have a third voltage value that is larger than the second voltage value.

Since the voltage of the first node n1 is the data voltage for sensing Vdata_sen in the sensing voltage sampling period S3, the voltage of the first node n1 may maintain the data voltage for sensing Vdata_sen for a short time if the sensing driving of the pixel circuit 101 is ended without the gate initialization period S4.

In case that the sensing driving of the pixel circuit 101 is re-performed when the voltage of the first node n1 maintains the data voltage for sensing Vdata_sen, the voltage of the first node n1 maintains the data voltage for sensing Vdata_sen even in the sensing initialization period S1 because the first switch element T1 is in a turn-off state in the sensing initialization period S1. Here, since the data voltage for sensing may be changed whenever the sensing driving of the pixel circuit 101 is repeated as described above, the voltage of the first node n1 may be changed every sensing initialization period S1 of the repeated sensing driving.

In other words, every sensing initialization period S1 of the repeated sensing driving, the gate electrode of the driving element DT is not always initialized to the same voltage.

Here, in order to secure accuracy of the external compensation, the voltage of the first node n1 should be always initialized to the same voltage.

Unless the gate electrode of the driving element DT is always initialized to the same voltage every sensing initialization period S1 of the repeated sensing driving, the accuracy of the external compensation may deteriorate, and thus, in the present disclosure, the voltage of the first node n1 is initialized to the black data voltage Vblack that is the same voltage in the gate initialization period S4.

Figure 15:
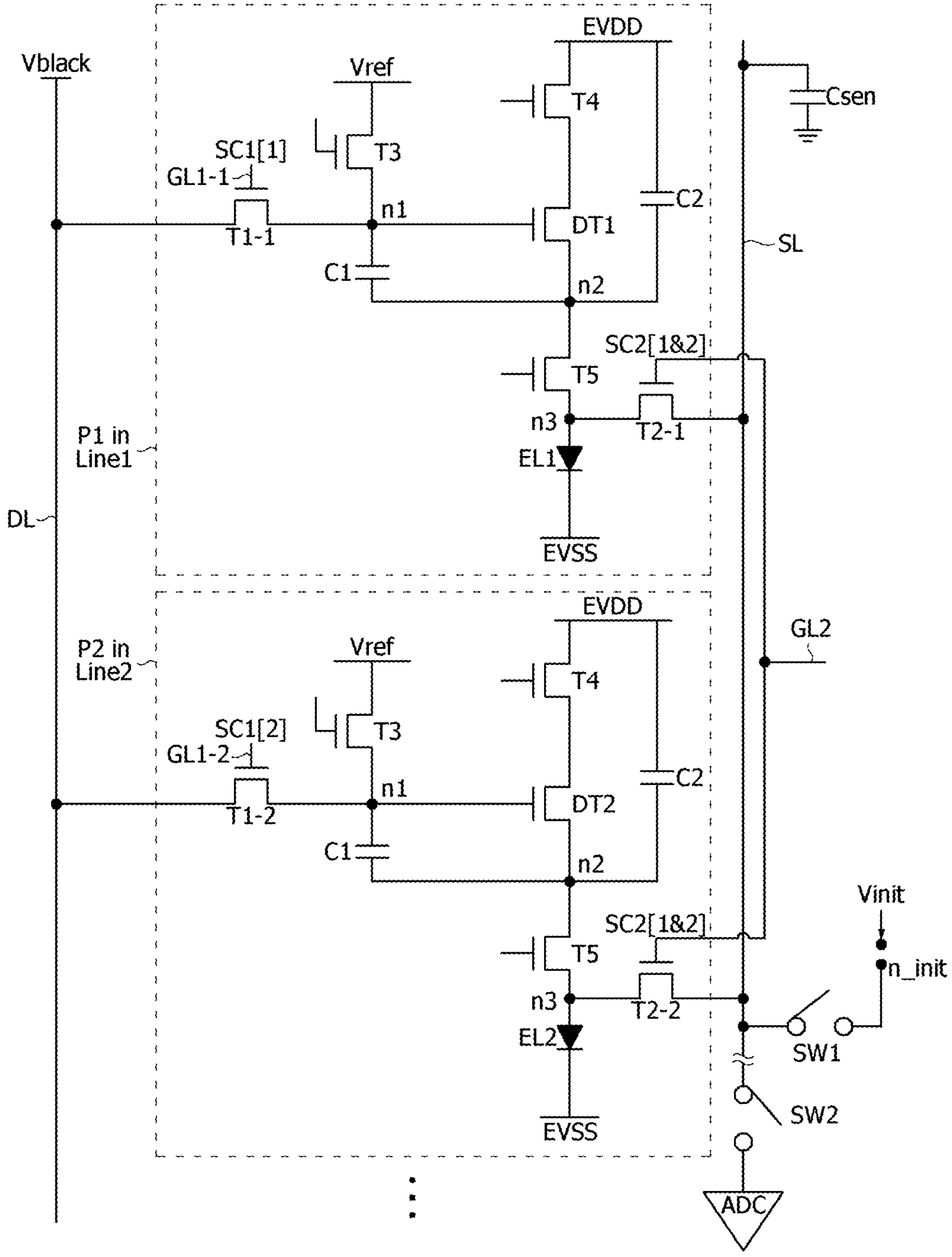
FIG. 15 is a diagram explaining a structure in which pixel lines of a display device share a gate signal according to an example embodiment of the present disclosure.

In addition, in an embodiment of the present disclosure, the display device may have a structure in which two pixel lines (e.g., Line[1] and Line[2]) sequentially disposed as in FIG. 15 share the second gate signal SC2 that is the gate signal for sensing.

In other words, the first pixel circuit P1 included in the first pixel line Line[1] and the second pixel circuit P2 included in the second pixel line Line[2] may share the second gate signal SC2 that is the gate signal for sensing. Here, the first pixel circuit P1 and the second pixel circuit P2 share the data line DL and the sensing line SL.

The light-emitting element EL, the driving element DT, the first switch element T1, and the second switch element T2 of the pixel circuit 101 are constituent elements that are mentioned when explaining the sensing driving of the pixel lines. Accordingly, in FIG. 15, the reference numerals of the light-emitting element EL, the driving element DT, the first switch element T1, and the second switch element T2 are separately denoted by the first pixel circuit P1 and the second pixel circuit P2.

Further, the third switch element T3, the fourth switch element T4, and the fifth switch element T5 of the pixel circuit 101 are constituent elements that are not mentioned when explaining the sensing driving of the pixel lines. Accordingly, in FIG. 15, the reference numerals of the third switch element T3, the fourth switch element T4, and the fifth switch element T5 are denoted without being separated by the first pixel circuit P1 and the second pixel circuit P2.

Referring to FIG. 15, the first pixel circuit P1 includes a first light-emitting element EL1 and a first driving element DT1 for driving the first light-emitting element EL1.

The first pixel circuit P1 may further include a (1-1)$^{th}$ switch element T1-1 that selectively connects the data line DL and the gate electrode side of the first driving element DT1 to each other, and a (2-1)$^{th}$ switch element T2-1 that selectively connects the sensing line SL and the second electrode side of the first driving element DT1 to each other. Here, the second electrode of the first driving element DT1 may be the source electrode of the first driving element DT1.

The second pixel circuit P2 includes a second light-emitting element EL2 and a second driving element DT2 for driving the second light-emitting element EL2.

The second pixel circuit P2 may further include a (first-second)$^{th}$ switch element T1-2 that selectively connects the data line DL and the gate electrode side of the second driving element DT2 to each other, and a (2-2)$^{th}$ switch element T2-2 that selectively connects the sensing line SL and the second electrode side of the second driving element DT2 to each other. Here, the second electrode of the second driving element DT2 may be the source electrode of the second driving element DT2.

Hereinafter, the sensing driving of the pixel lines that share one gate signal for sensing will be described.

Figure 16:
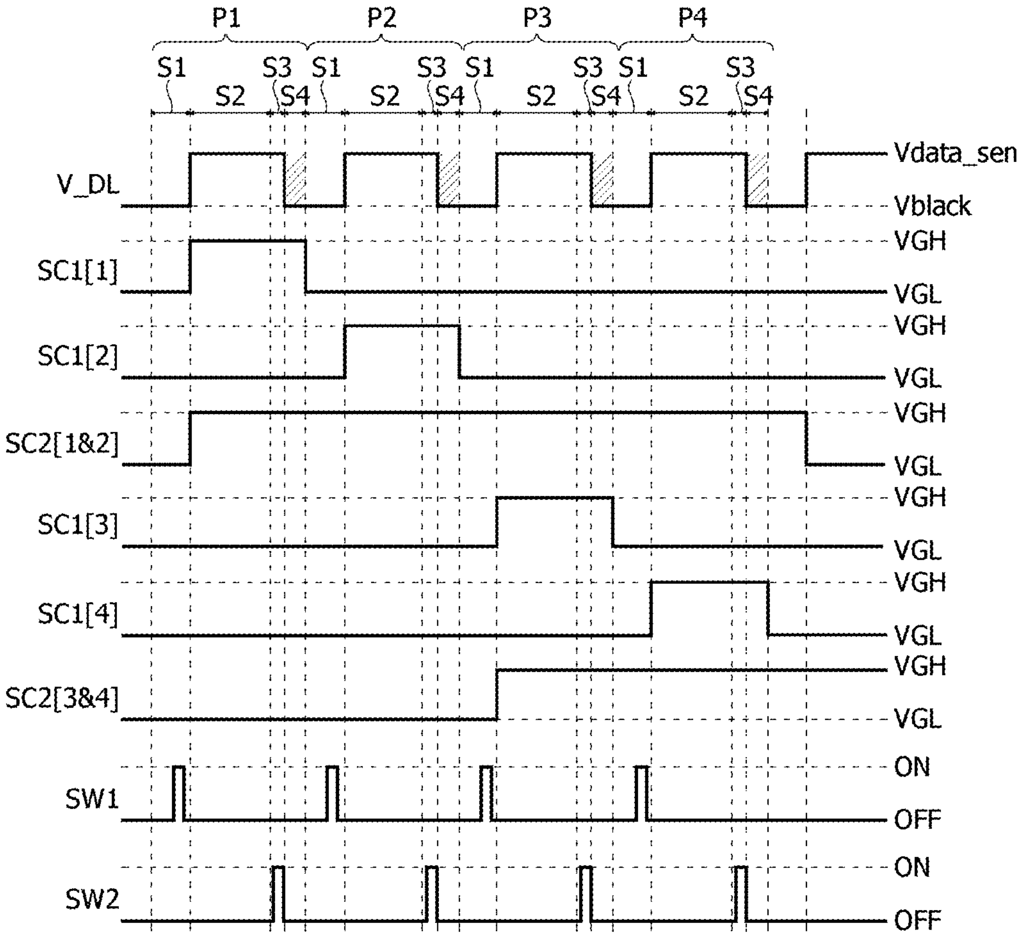
FIG. 16 is a waveform diagram showing waveforms of signals being applied to pixel lines during sensing driving of pixel lines according to an example embodiment of the present disclosure.

FIG. 16 is a waveform diagram showing waveforms of signals being applied to pixel lines during sensing driving of pixel lines according to an embodiment of the present disclosure.

Here, for the sensing driving of the pixel lines that share one gate signal for sensing, for example, for the sensing driving of the first pixel circuit P1 of the first pixel line Line[1] and the second pixel circuit P2 of the second pixel line Line[2], the gate driving circuit 120 should output the first gate signal SC1 that is a gate signal for data writing and the second gate signal SC2 that is a gate signal for sensing, and the data driving circuit 110 should sequentially output the data voltage for sensing Vdata_sen and the black data voltage Vblack.

Accordingly, the sensing driving of the first pixel circuit P1 and the second pixel circuit P2 will be described mainly through the operations of the gate driving circuit 120 and the data driving circuit 110.

Referring to FIGS. 15 and 16, after progressing of the sensing initialization period S1, the sensing period S2, the sensing voltage sampling period S3, and the gate initialization period S4 of the first pixel circuit P1, the sensing initialization period S1, the sensing period S2, the sensing voltage sampling period S3, and the gate initialization period S4 of the second pixel circuit P2 are in progress. In other words, the sensing driving of the pixel lines is in sequential progress.

First, in the sensing initialization period S1 of the first pixel circuit P1, the gate driving circuit 120 outputs the gate-off voltage VGL of the (1-1)$^{th}$ gate signal SC1[1] to the (1-1)$^{th}$ gate line GL1-1 connected to the first pixel circuit P1, and outputs the gate-off voltage of the second gate signal SC2[1&2] to the second gate line GL2 that is commonly connected to the first pixel circuit P1 and the second pixel circuit P2.

Further, the gate driving circuit 120 outputs the gate-off voltage VGL of the (1-2)$^{th}$ gate signal SC1[2] to the (1-2)$^{th}$ gate line GL1-2 connected to the second pixel circuit P2.

In other words, in the sensing initialization period S1 of the first pixel circuit P1, the voltages of the (1-1)$^{th}$ gate signal SC1[1], the (1-2)$^{th}$ gate signal SC1[2], and the second gate signal SC2[1&2] may be the gate-off voltages VGL.

Here, the (1-1)$^{th}$ gate line GL1-1 is singly connected to the first pixel circuit P1, and the (1-2)$^{th}$ gate line GL1-2 is singly connected to the second pixel circuit P2.

In the sensing initialization period S1 of the first pixel circuit P1, the (1-1)$^{th}$ switch element T1-1 and the (2-1)$^{th}$ switch element T2-1 of the first pixel circuit P1 are turned off by the above gate signals, and the (1-2)$^{th}$ switch element T1-2 and the (2-2)$^{th}$ switch element T2-2 of the second pixel circuit P2 are also turned off.

In other words, in the sensing initialization period S1 of the first pixel circuit P1, the gate driving circuit 120 does not electrically connect the first pixel circuit P1 and the second pixel circuit P2 to the data line DL and the sensing line SL.

Here, the (1-1)$^{th}$ gate signal SC1[1] is the gate signal for data writing of the first pixel circuit P1, and the second gate signal SC2[1&2] is the gate signal for sensing of the first pixel circuit P1 and the second pixel circuit P2. Further, the (1-2)$^{th}$ gate signal SC1[2] is the gate signal for data writing of the second pixel circuit P2.

In addition, in the sensing initialization period S1 of the first pixel circuit P1, the initialization switch element SW1 is turned on, and the sampling switch element SW2 is turned off.

As a result, in the sensing initialization period S1 of the first pixel circuit P1, the capacitor Csen for sensing of the sensing line SL is initialized to the initialization voltage Vinit.

In the sensing initialization period S1 of the first pixel circuit P1, the data driving circuit 110 outputs the black data voltage Vblack to the data line DL, but the black data voltage Vblack is not applied to the first pixel circuit P1 and the second pixel circuit P2 because the (1-1)$^{th}$ switch element T1-1 and the (1-2)$^{th}$ switch element T1-2 are in a turn-off state.

During the sensing period S2 to the gate initialization period S4 of the first pixel circuit P1, the gate driving circuit 120 outputs the gate-on voltage VGH of the (1-1)$^{th}$ gate signal SC1[1] to the (1-1)$^{th}$ gate line GL1-1. Further, the gate driving circuit 120 outputs the gate-on voltage VGH of the second gate signal SC2[1&2] to the second gate line GL2.

Further, the gate driving circuit 120 outputs the gate-off voltage VGL of the (1-2)$^{th}$ gate signal SC1[2] to the (1-2)$^{th}$ gate line GL1-2.

In other words, in the sensing period S2, the sensing voltage sampling period S3, and the gate initialization period S4 of the first pixel circuit P1, the voltages of the (1-1)$^{th}$ gate signal SC1[1] and the second gate signal SC2 [1&2] may be the gate-on voltages VGH, and the voltage of the (1-2)$^{th}$ gate signal SC1[2] may be the gate-off voltage VGL.

Accordingly, during the sensing period S2 to the gate initialization period S4 of the first pixel circuit P1, the 1-1 switch element T1-1 and the 2-1 switch element T2-1 of the first pixel circuit P1 are turned-on, and the 2-2 switch element T2-2 of the second pixel circuit P2 is turned-on. And the 1-2 switch element T1-2 of the second pixel circuit P2 is turned-off.

In other words, during the sensing period S2 to the gate initialization period S4 of the first pixel circuit P1, the gate driving circuit 120 outputs the gate-on voltage VGH of the (1-1)$^{th}$ gate signal SC1[1] to the first pixel circuit P1. Due to this, the first pixel circuit P1 and the data line DL are electrically connected to each other.

Further, the gate driving circuit 120 outputs the gate-on voltage VGH of the second gate signal SC2[1&2] to the first pixel circuit P1 and the second pixel circuit P2. Due to this, the first pixel circuit P1, the second pixel circuit P2, and the sensing line SL are electrically connected to each other.

In addition, during the gate-on voltage VGH period of the (1-1)$^{th}$ gate signal SC1[1], the data driving circuit 110 sequentially outputs the data voltage for sensing Vdata_sen and the black data voltage Vblack to the data line DL.

In other words, the data driving circuit 110 outputs the data voltage for sensing Vdata_sen to the data line DL from the sensing period S2 to the sensing voltage sampling period S3 of the first pixel circuit P1, and outputs the black data voltage Vblack to the data line DL in the gate initialization period S4.

Since the data line DL and the first pixel circuit P1 are electrically connected to each other by the gate-on voltage VGH of the (1-1)$^{th}$ gate signal SC1[1] in the sensing period S2, the data voltage for sensing Vdata_sen is applied to the gate electrode of the first driving element DT1. Due to this, the first sensing voltage including the threshold voltage of the first driving element DT1 is transferred to the sensing line SL. Accordingly, the first sensing voltage can be charged in the capacitor for sensing Csen of the sensing line SL.

Since the sampling switch element SW2 is turned on in the sensing voltage sampling period S3 of the first pixel circuit P1, the first sensing voltage charged in the capacitor for sensing Csen may be transferred to the analog to digital converter (ADC).

In addition, since the data line DL and the first pixel circuit P1 are electrically connected to each other even in the gate initialization period S4, the black data voltage Vblack is applied to the gate electrode of the first driving element DT1, and thus the voltage of the gate electrode of the first driving element DT1 is initialized to the black data voltage Vblack.

At a time when the gate initialization period S4 is ended, the gate driving circuit 120 may invert the gate-on voltage VGH of the (1-1)$^{th}$ gate signal SC1[1] to the gate-off voltage VGL, and may output the gate-off voltage VGL to the (1-1)$^{th}$ gate line GL1-1.

Thereafter, the gate driving circuit 120 may output the gate-on voltage VGH of the (1-2)$^{th}$ gate signal SC1[2] to the (1-2)$^{th}$ gate line GL1-2. In other words, the gate driving circuit 120 may invert the gate-off voltage VGL of the (1-2)$^{th}$ gate signal SC1[2] to the gate-on voltage VGH, and may output the inverted gate-on voltage VGH to the (1-2)$^{th}$ gate line GL1-2.

Here, the period from the time when the gate-on voltage VGH of the (1-1)$^{th}$ gate signal SC1[1] is inverted to the gate-off voltage VGL to the time when the gate-off voltage VGL of the (1-2)$^{th}$ gate signal SC1[2] is inverted to the gate-on voltage VGH may be the sensing initialization period S1 of the second pixel circuit P2.

In other words, the sensing initialization period S1 of the second pixel circuit P2 comes just after the gate initialization period S4 of the first pixel circuit P1.

In the sensing initialization period S1 of the second pixel circuit P2, the gate driving circuit 120 outputs the gate-off voltage VGL of the (1-1)$^{th}$ gate signal SC1[1] to the (1-1)$^{th}$ gate line GL1-1, and outputs the gate-off voltage VGL of the (1-2)$^{th}$ gate signal SC1[2] to the (1-2)$^{th}$ gate line GL1-2.

In the sensing initialization period S1 of the second pixel circuit P2, the (1-1)$^{th}$ switch element T1-1 of the first pixel circuit P1 and the (1-2)$^{th}$ switch element T1-2 of the second pixel circuit P2 are turned off by the above-described gate signals.

In other words, in the sensing initialization period S1 of the second pixel circuit P2, the gate driving circuit 120 does not electrically connect the first pixel circuit P1 and the second pixel circuit P2 to the data line DL.

In addition, the gate driving circuit 120 continuously outputs the gate-on voltage VGH of the second gate signal SC2[1&2] to the second gate line GL2 even in the sensing initialization period S1 of the second pixel circuit P2. Due to this, the first pixel circuit P1, the second pixel circuit P2, and the sensing line SL can maintain the electrical connection to each other.

In the sensing initialization period S1 of the second pixel circuit P2, the initialization switch element SW1 is turned on, and the sampling switch element SW2 is turned off.

As a result, in the sensing initialization period S1 of the second pixel circuit P2, the capacitor for sensing Csen of the sensing line SL is again initialized to the initialization voltage Vinit.

Even in the sensing initialization period S1 of the second pixel circuit P2, the data driving circuit 110 outputs the black data voltage Vblack to the data line DL, but the black data voltage Vblack is not applied to the first pixel circuit P1 and the second pixel circuit P2 because the (1-1)$^{th}$ switch element T1-1 and the (1-2)$^{th}$ switch element T2 are in a turn-off state.

During the sensing period S2 to the gate initialization period S4 of the second pixel circuit P2, the gate driving circuit 120 outputs the gate-on voltage VGH of the (1-2)$^{th}$ gate signal SC1[2] to the (1-2)$^{th}$ gate line GL1-2. Further, the gate driving circuit 120 outputs the gate-on voltage VGH of the second gate signal SC2[1&2] to the second gate line GL2.

Further, the gate driving circuit 120 outputs the gate-off voltage VGL of the (1-1)$^{th}$ gate signal SC1[1] to the (1-1)$^{th}$ gate line GL1-1.

In other words, in the sensing period S2, the sensing voltage sampling period S3, and the gate initialization period S4 of the second pixel circuit P2, the voltages of the (1-2)$^{th}$ gate signal SC1[2] and the second gate signal SC2 [1&2] may be the gate-on voltage VGH, and the voltage of the (1-1)$^{th}$ gate signal SC1[1] may be the gate-off voltage VGL.

Accordingly, during the sensing period S2 to the gate initialization period S4 of the second pixel circuit P2, the (1-2)$^{th}$ switch element T1-2 of the second pixel circuit P2 is turned on. Further, the (2-2)$^{th}$ switch element T2-2 of the second pixel circuit P2 and the (2-1)$^{th}$ switch element T2-1 of the first pixel circuit P1 maintain a turn-on state. The (1-1)$^{th}$ switch element T1-1 maintains a turn-off state.

In other words, during the sensing period S2 to the gate initialization period S4 of the second pixel circuit P2, the gate driving circuit 120 outputs the gate-on voltage VGH of the (1-2)$^{th}$ gate signal SC1[2] to the second pixel circuit P2. Due to this, the second pixel circuit P2 and the data line VGH are electrically connected to each other.

Further, the gate driving circuit 120 continuously outputs the gate-on voltage VGH of the second gate signal SC2 [1&2] to the second gate line GL2 even in the sensing period S2 to the gate initialization period S4 of the second pixel circuit P2. Due to this, the first pixel circuit P1, the second pixel circuit P2, and the sensing line SL can maintain the electrical connection to each other.

In an embodiment of the present disclosure, the gate driving circuit 120 may sequentially output the gate-on voltage VGH of the (1-1)$^{th}$ gate signal SC1[1] and the gate-on voltage VGH of the (1-2)$^{th}$ gate signal SC1[2] in the gate-on voltage VGH period of the second gate signal SC2[1&2] as described above.

Here, the gate-on voltage VGH period of the (1-1)$^{th}$ gate signal SC1[1] and the gate-on voltage VGH period of the (1-2)$^{th}$ gate signal SC1[2]] are equal to each other, and the gate-on voltage VGH period of the second gate signal SC2[1&2] may be a period that is longer than four times the gate-on voltage VGH period of the (1-1)$^{th}$ gate signal SC1[1] or the gate-on voltage VGH period of the (1-2)$^{th}$ gate signal SC1[2]. In another example, the second gate signal SC2 [1&2] may also be commonly connected to pixel circuits in two or more other pixel lines (e.g., third pixel line and fourth pixel line) instead of a second gate signal SC2[3&4]. In this case, the number of gate signals for sensing which are output from the gate driving circuit 120 may be further reduced to ¼, and thus the size of the gate driving circuit can be further reduced and the size of the bezel area in which the gate driving circuit is disposed can also be further reduced.

Figure 17:
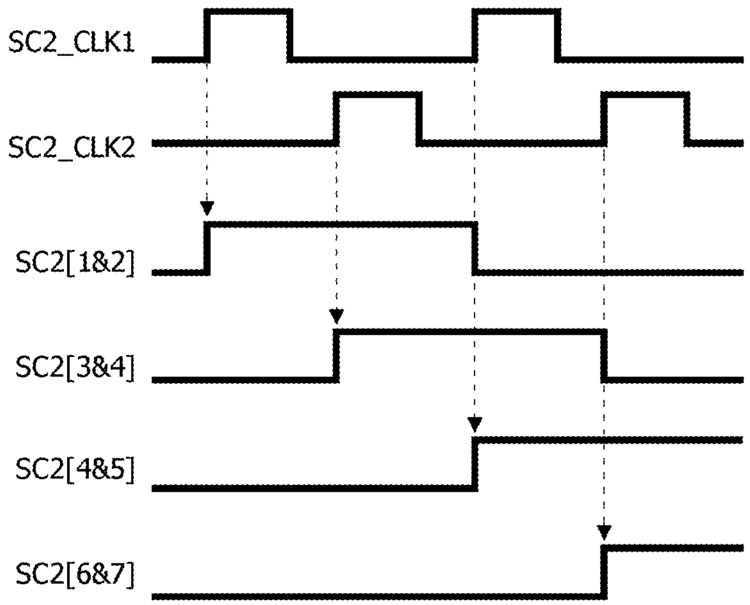
FIG. 17 is a diagram explaining a constitution in which a display device outputs a gate signal according to an example embodiment of the present disclosure.

The second gate signal SC2[1&2] as described above may be output from the second gate driving unit 320 of the gate driving circuit 120. The second gate driving unit 320 may be implemented as an edge trigger circuit, and the edge trigger circuit may output the gate-on voltage VGH of the second gate signal SC2[1&2] in synchronization with a rising edge of a first shift clock SC2_CLK1 that is output from the level shifter 150 as in FIG. 17.

Here, the edge trigger circuit may output a second gate signal SC2[3&4] that is output to two other pixel lines (e.g., third pixel line and fourth pixel line) by using a rising edge of a second shift clock SC2_CLK2 of which the phase is shifted at the first shift clock SC2_CLK1. Due to the nature of the edge trigger circuit that outputs the gate signal in synchronization with the rising edge of the shift clock, in the two second gate signals SC2[1&2] and SC2[3&4], parts of the gate-on voltage periods may overlap each other as in FIG. 17.

In addition, during the gate-on voltage VGH period of the (1-2)$^{th}$ gate signal SC1[2], the data driving circuit 110 sequentially outputs the data voltage for sensing Vdata_sen and the black data voltage Vblack to the data line DL.

In other words, the data driving circuit 110 outputs the data voltage for sensing Vdata_sen to the data line DL from the sensing period S2 to the sensing voltage sampling period S3 of the second pixel circuit P2, and outputs the black data voltage Vblack to the data line DL in the gate initialization period S4.

Since the data line DL and the second pixel circuit P2 are electrically connected by the gate-on voltage VGH of the (1-2)$^{th}$ gate signal SC1[2] in the sensing period S2 of the second pixel circuit P2, the data voltage for sensing Vdata_sen is applied to the gate electrode of the second driving element DT2. Due to this, the second sensing voltage including the threshold voltage of the second driving element DT2 is transferred to the sensing line SL. Accordingly, the second sensing voltage can be charged in the capacitor for sensing Csen of the sensing line SL.

Since the sampling switch element SW2 is turned on in the sensing voltage sampling period S3 of the second pixel circuit P2, the second sensing voltage charged in the capacitor for sensing Csen may be transferred to the analog to digital converter (ADC).

In addition, since the data line DL and the second pixel circuit P2 are electrically connected to each other even in the gate initialization period S4 of the second pixel circuit P2, the black data voltage Vblack is applied to the gate electrode of the second driving element DT2, and thus the voltage of the gate electrode of the second driving element DT2 is initialized to the black data voltage Vblack.

At a time when the gate initialization period S4 of the second pixel circuit P2 is ended, the gate driving circuit 120 may invert the gate-on voltage VGH of the (1-2)$^{th}$ gate signal SC1[2] to the gate-off voltage VGL, and may output the gate-off voltage VGL to the (1-2)$^{th}$ gate line GL1-2.

Here, the gate-on voltage VGH period of the second gate signal SC2[1&2] may overlap the gate-on voltage VGH period of the second gate signal SC2[3&4] that is output to two different pixel lines (third pixel line and the fourth pixel line).

Due to this, the gate-on voltage VGH period of the $(1-3)^{th}$ gate signal SC1[3] that is the gate signal for data writing of the third pixel circuit P3 may overlap the gate-on voltage VGH period of the second gate signal SC2[1&2]. Further, the gate-on voltage VGH period of the $(1-4)^{th}$ gate signal SC1[4] that is the gate signal for data writing of the fourth pixel circuit P4 included in the fourth pixel line may further overlap the gate-on voltage VGH period of the second gate signal SC2[1&2].

In addition, if the gate driving circuit 120 inverts the gate-on voltage VGH of the second gate signal SC2[1&2] to the gate-off voltage VGL and outputs the gate-off voltage VGL to the second gate line GL2, the $(2-1)^{th}$ switch element T2-1 of the first pixel circuit P1 and the $(2-2)^{th}$ switch element T2-2 of the second pixel circuit P2 are turned off.

Due to this, the first pixel circuit P1 is electrically separated from the sensing line SL, and the second pixel circuit P2 is electrically separated from the sensing line SL.

As described above, since one gate signal for sensing that is output from the gate driving circuit 120, for example, the second gate signal SC2[1&2], is commonly input to the first pixel circuit P1 and the second pixel circuit P2 through the second gate line GL2, the number of gate signals for sensing which are output from the gate driving circuit 120 may be reduced. If the number of gate signals for sensing is reduced, the number of gate lines for outputting the gate signals for sensing is also reduced, and thus the size of the gate driving circuit can be reduced. Due to this, the size of the bezel area in which the gate driving circuit is disposed can also be reduced.

Hereinafter, a process in which a display device according to an embodiment of the present disclosure senses the electrical characteristics of pixel circuits will be described.

Figure 18:
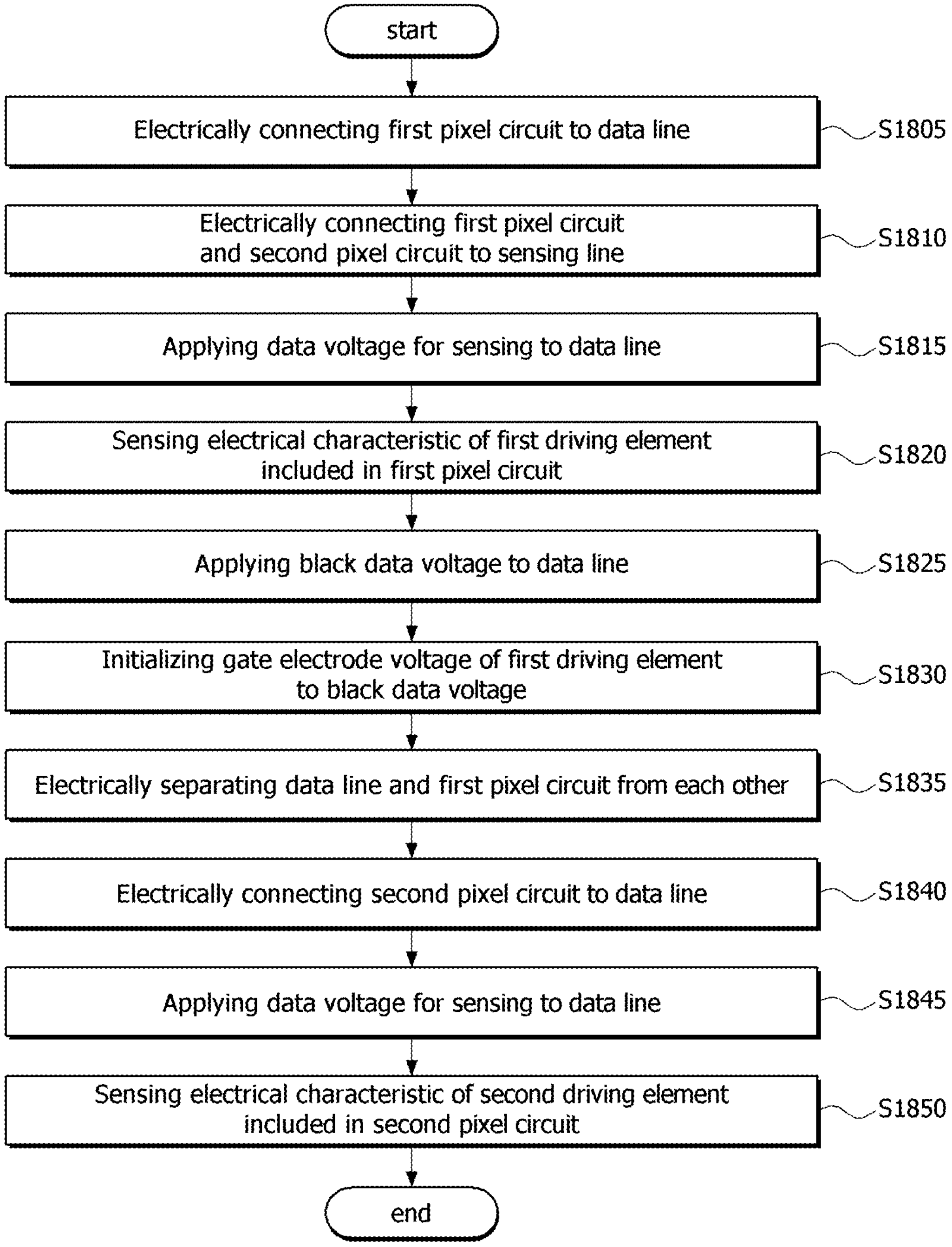
FIGS. 18 and 19 are flowcharts illustrating a process in which a display device senses electrical characteristics of pixel circuits according to an example embodiment of the present disclosure.
Figure 19:
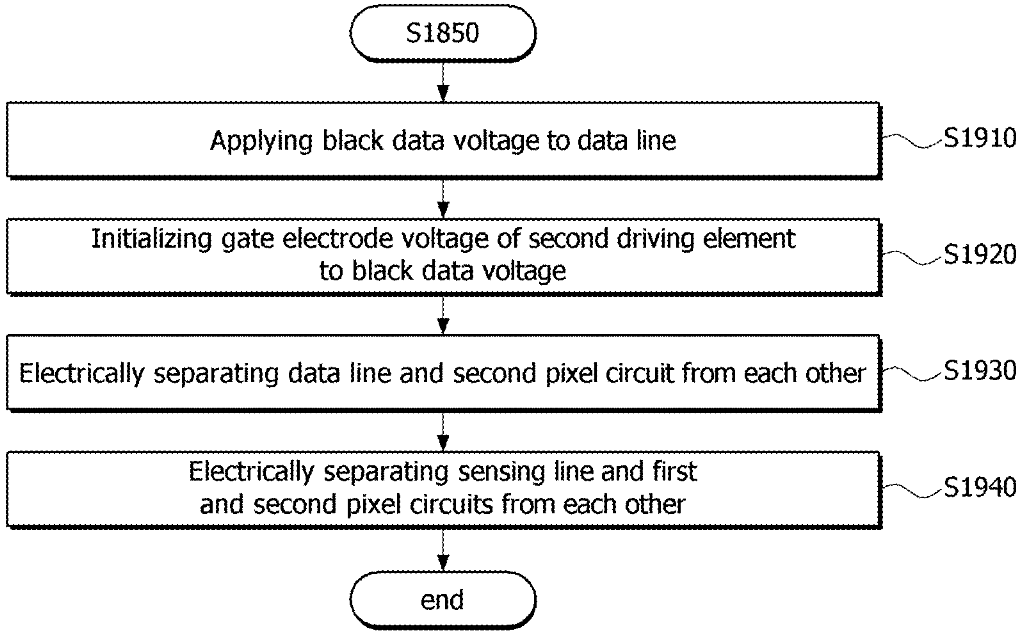

FIGS. 18 and 19 are flowcharts illustrating a process in which a display device senses electrical characteristics of pixel circuits according to an embodiment of the present disclosure.

The display device can sense the electrical characteristics of the pixel circuits in at least any one of a power-on sequence where the power starts to be applied and a power-off sequence where the power is blocked.

First, referring to FIG. 18, the display device electrically connect the first pixel circuit P1 to the data line DL between the first pixel circuit P1 and the second pixel circuit P2 which share the data line DL and the sensing line SL (S1805). Here, the first pixel circuit P1 may be a pixel circuit included in the first pixel line between the first pixel line and the second pixel line which are sequentially disposed, and the second pixel circuit P2 may be a pixel circuit included in the second pixel line.

In step S1805, the display device does not electrically connect the second pixel circuit P2 to the data line DL.

When electrically connecting the first pixel circuit P1 to the data line DL, the display device electrically connects the first pixel circuit P1 and the second pixel circuit P2 to the sensing line SL (S1810).

The display device senses the electrical characteristic of the first driving element DT1 included in the first pixel circuit P1 by applying the data voltage for sensing Vdata_sen to the data line DL (S1815 and S1820). Here, the electrical characteristic of the first driving element DT1 may be the threshold voltage of the first driving element DT1.

After sensing the electrical characteristic of the first driving element DT1, the display device initializes the gate electrode voltage of the first driving element DT1 to the black data voltage Vblack by applying the black data voltage Vblack to the data line DL (S1825 and S1830).

After the step S1830, the display device electrically separates the first pixel circuit P1 from the data line DL (S1835).

Thereafter, the display device electrically connects the second pixel circuit P2 to the data line DL.

The display device senses the electrical characteristic of the second driving element DT2 included in the second pixel circuit P2 by applying the data voltage for sensing Vdata_sen to the data line DL (S1845 and S1850). Here, the electrical characteristic of the second driving element DT2 may be the threshold voltage of the second driving element DT2.

After the step S1835, the display device initializes the voltage of the sensing line SL to the initialization voltage Vinit by applying the initialization voltage Vinit to the sensing line SL. After initializing the sensing line SL to the initialization voltage Vinit, the display device may perform the step S1840.

After the step S1850, the display device may further perform a process as in FIG. 19.

Referring to FIG. 19, the display device initializes the gate electrode voltage of the second driving element DT2 to the black data voltage Vblack by applying the black data voltage Vblack to the data line DL (S1910 and S1920).

After the step S1920, the display device electrically separates the second pixel circuit P2 from the data line DL (S1930).

After the step S1930, the display device electrically separate the first pixel circuit P1 and the second pixel circuit P2 from the sensing line SL (S1940).

The display device having sensed the electrical characteristic of the pixel circuits through the above-described process may change video data by using a compensation value for reducing the electrical characteristic deviation of the pixel circuits.

The objects to be achieved by the present disclosure, the means for achieving the objects, and effects of the present disclosure described above do not specify essential features of the claims, and thus, the scope of the claims is not limited to the disclosure of the present disclosure.

Although the embodiments of the present disclosure have been described in more detail with reference to the accompanying drawings, the present disclosure is not limited thereto and may be embodied in many different forms without departing from the technical concept of the present disclosure. Therefore, the embodiments disclosed in the present disclosure are provided for illustrative purposes only and are not intended to limit the technical concept of the present disclosure. The scope of the technical concept of the present disclosure is not limited thereto. Therefore, it should be understood that the above-described embodiments are illustrative in all aspects and do not limit the present disclosure. The protective scope of the present disclosure should be construed based on the following claims, and all the technical concepts in the equivalent scope thereof should be construed as falling within the scope of the present disclosure.

What is claimed is:

1. A display device comprising: a display panel including a first pixel circuit and a second pixel circuit that share a data line and a sensing line; and a gate driving circuit configured to output a gate-on voltage of a $(1-2)^{th}$ gate signal to a $(1-2)^{th}$ gate line connected to the second pixel circuit after outputting a gate-on voltage of a $(1-1)^{th}$ gate signal to a $(1-1)^{th}$ gate line connected to the first pixel circuit, and to output a gate-on voltage of a second gate signal to a second gate line that is commonly connected to the first pixel circuit and the second pixel circuit, wherein the first pixel circuit includes a first switch element connected between the sensing line and an anode electrode of a first light-emitting element, and the second pixel circuit includes a second switch element connected between the sensing line and an anode electrode of a second light-emitting element, and wherein the first switch element and the second switch element share the second gate line, and wherein the gate driving circuit is configured to sequentially output the gate-on voltage of the $(1-1)^{th}$ gate signal and the gate-on voltage of the $(1-2)^{th}$ gate signal within a gate-on voltage period of the second gate signal.

2. The display device of claim 1, further comprising: a data driving circuit configured to output a data voltage for sensing to the data line during a gate-on voltage period of the $(1-1)^{th}$ gate signal, and to output the data voltage for sensing to the data line during a gate-on voltage period of the $(1-2)^{th}$ gate signal.

3. The display device of claim 2, wherein the first pixel circuit and the data line are electrically connected to each other by the $(1-1)^{th}$ gate signal such that the data voltage for sensing is input to the first pixel circuit, and the second pixel circuit and the data line are electrically connected to each other by the $(1-2)^{th}$ gate signal such that the data voltage for sensing is input to the second pixel circuit.

4. The display device of claim 2, wherein the gate driving circuit is configured to output the gate-on voltage of the $(1-2)^{th}$ gate signal to the $(1-2)^{th}$ gate line after inverting the gate-on voltage of the $(1-1)^{th}$ gate signal to a gate-off voltage and outputting the inverted gate-off voltage to the $(1-1)^{th}$ gate line.

5. The display device of claim 2, wherein the gate driving circuit comprises a shift register circuit that outputs the $(1-1)^{th}$ gate signal and the $(1-2)^{th}$ gate signal, and an edge trigger circuit that outputs the second gate signal.

6. The display device of claim 2, wherein the first pixel circuit is configured to be driven in an order of a first sensing initialization period, a first sensing period after the first sensing initialization period, a first sensing voltage sampling period after the first sensing period, and a first gate initialization period after the first sensing voltage sampling period, wherein the $(1-1)^{th}$ gate signal, the $(1-2)^{th}$ gate signal, and the second gate signal are gate-off voltages in the first sensing initialization period; and the $(1-1)^{th}$ gate signal and the second gate signal are the gate-on voltages, and the $(1-2)^{th}$ gate signal is the gate-off voltage in the first sensing period, the first sensing voltage sampling period, and the first gate initialization period.

7. The display device of claim 6, wherein the first pixel circuit further comprises a first driving element that drives the first light-emitting element, wherein the data voltage for sensing is applied to a gate electrode of the first driving element through the data line during the first sensing period and the first sensing voltage sampling period, and a black data voltage is applied to the gate electrode of the first driving element through the data line such that a gate electrode voltage of the first driving element is initialized to the black data voltage during the first gate initialization period.

8. The display device of claim 7, wherein a first sensing voltage including a threshold voltage of the first driving element is transferred to the sensing line in the first sensing period.

9. The display device of claim 6, wherein the second pixel circuit is configured to be driven after the first gate initialization period in an order of a second sensing initialization period, a second sensing period after the second sensing initialization period, a second sensing voltage sampling period after the second sensing period, and a second gate initialization period after the second sensing voltage sampling period, wherein the second gate signal is the gate-on voltage, and the $(1-1)^{th}$ gate signal and the $(1-2)^{th}$ gate signal are the gate-off voltages in the second sensing initialization period, and the $(1-2)^{th}$ gate signal and the second gate signal are the gate-on voltages, and the $(1-1)^{th}$ gate signal is the gate-off voltage in the second sensing period, the second sensing voltage sampling period, and the second gate initialization period.

10. The display device of claim 9, wherein the second pixel circuit further comprises a second driving element that drives the second light-emitting element, wherein the data voltage for sensing is applied to a gate electrode of the second driving element through the data line during the second sensing period and the second sensing voltage sampling period, and a black data voltage is applied to the gate electrode of the second driving element through the data line such that the gate electrode voltage of the second driving element is initialized to the black data voltage during the second gate initialization period.

11. The display device of claim 10, wherein a second sensing voltage including a threshold voltage of the second driving element is transferred to the sensing line in the second sensing period.

12. The display device of claim 2, wherein the gate-on voltage period of the $(1-1)^{th}$ gate signal and the gate-on voltage period of the $(1-2)^{th}$ gate signal are equal to each other, and a gate-on voltage period of the second gate signal is a period that is longer than four times the gate-on voltage period of the $(1-1)^{th}$ gate signal.

13. A pixel sensing method of a display device, comprising:

electrically connecting a first pixel circuit that is connected to a $(1-1)^{th}$ gate line to a data line by a gate-on voltage of a $(1-1)^{th}$ gate signal applied to the $(1-1)^{th}$ gate line, and electrically connecting the first pixel circuit and a second pixel circuit that are commonly connected to a second gate line to a sensing line by a gate-on voltage of a second gate signal applied to the second gate line;

sensing an electrical characteristic of a first driving element included in the first pixel circuit by applying a data voltage for sensing to the data line;

electrically separating the first pixel circuit from the data line;

electrically connecting the second pixel circuit that is connected to a $(1-2)^{th}$ gate line to the data line by a gate-on voltage of a $(1-2)^{th}$ gate signal applied to the $(1-2)^{th}$ gate line in a state that the first pixel circuit and the second pixel circuit are connected to the sensing line; and sensing an electrical characteristic of a second driving element included in the second pixel circuit by applying the data voltage for sensing to the data line, wherein the first pixel circuit and the second pixel circuit share the data line and the sensing line, and wherein the gate-on voltage of the $(1\text{-}1)^{th}$ gate signal and the gate-on voltage of the $(1\text{-}2)^{th}$ gate signal are sequentially applied within a gate-on voltage period of the second gate signal.

14. The pixel sensing method of claim 13, further comprising:

before electrically separating the first pixel circuit from the data line, initializing a gate electrode voltage of the first driving element to a black data voltage by applying the black data voltage to the data line.

15. The pixel sensing method of claim 14, further comprising:

after sensing the electrical characteristic of the second driving element, initializing a gate electrode voltage of the second driving element to the black data voltage by applying the black data voltage to the data line;

electrically separating the second pixel circuit from the data line; and electrically separating the first pixel circuit and the second pixel circuit from the sensing line.

16. The pixel sensing method of claim 13, further comprising:

after electrically separating the first pixel circuit, initializing a voltage of the sensing line to an initialization voltage by applying the initialization voltage to the sensing line.

* * * * *